(12) United States Patent
Kneckt et al.

(10) Patent No.: US 12,034,539 B2
(45) Date of Patent: Jul. 9, 2024

(54) BLOCK ACKNOWLEDGMENT OPERATION FOR MULTI-LINK WLAN

(71) Applicant: Apple Inc., Cupertino, CA (US)

(72) Inventors: Jarkko L. Kneckt, Los Gatos, CA (US); Jinjing Jiang, San Jose, CA (US); Su Khiong Yong, Palo Alto, CA (US); Tianyu Wu, Cupertino, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/108,193

(22) Filed: Feb. 10, 2023

(65) Prior Publication Data

US 2023/0188264 A1 Jun. 15, 2023

Related U.S. Application Data

(63) Continuation of application No. 16/941,146, filed on Jul. 28, 2020, now Pat. No. 11,581,980.

(60) Provisional application No. 62/899,802, filed on Sep. 13, 2019.

(51) Int. Cl.
*H04L 1/1607* (2023.01)
*H04L 1/1867* (2023.01)
*H04W 28/04* (2009.01)

(52) U.S. Cl.
CPC ......... *H04L 1/1621* (2013.01); *H04L 1/1614* (2013.01); *H04L 1/189* (2013.01); *H04W 28/04* (2013.01)

(58) Field of Classification Search
CPC ..... H04L 1/1621; H04L 1/1614; H04L 1/189; H04W 28/04
See application file for complete search history.

(56) References Cited

U.S. PATENT DOCUMENTS

| | | | |
|---|---|---|---|
| 2005/0147045 A1* | 7/2005 | Alam | H04L 1/1887 370/282 |
| 2008/0225703 A1 | 9/2008 | Rider et al. | |
| 2017/0311310 A1 | 10/2017 | Ryu et al. | |
| 2018/0205502 A1* | 7/2018 | Merlin | H04W 52/0216 |
| 2021/0083805 A1 | 3/2021 | Kneckt et al. | |

* cited by examiner

*Primary Examiner* — Jamal Javaid
(74) *Attorney, Agent, or Firm* — Sterne, Kessler, Goldstein & Fox P.L.L.C.

(57) ABSTRACT

Some embodiments of this disclosure include apparatuses and methods for implementing block acknowledgment (BA) operations for multi-link wireless communication networks. For example some embodiments relate to an electronic device including a transceiver and one or more processors communicatively coupled to the transceiver. The one or more processors transmit, using the transceiver and to a second electronic device, a first set of one or more frames on a first link and a second set of one or more frames on a second link. The one or more processors receive, using the transceiver and from the second electronic device, a first block acknowledgment (BA) frame on the first link and a second BA frame on the second link. The one or more processors further determine, based on received first BA frame and the second BA frame, a failed or missing frame of the first set of one or more frames transmitted on the first link.

20 Claims, 14 Drawing Sheets

BLOCK ACKNOWLEDGMENT OPERATION FOR MULTI-LINK WLAN

CROSS-REFERENCE TO RELATED APPLICATIONS

The present application is a continuation of U.S. patent application Ser. No. 16/941,146, filed Jul. 28, 2020, which claims the benefit of U.S. Provisional Patent Application No. 62/899,802, filed on Sep. 13, 2019, both of which are hereby incorporated by reference in their entireties.

BACKGROUND

Field

The described embodiments generally relate to channel access in wireless communications. For example, the embodiments of this disclosure relate to block acknowledgement (BA) operation in multi-link wireless communication networks such as a wireless local area network (WLAN).

Related Art

When two stations are communicating with each other, acknowledgment schemes can be used to ensure that data sent by the transmitting station is correctly received by the receiving station. One acknowledgment scheme can include block acknowledgement (BA) operation where instead of sending individual acknowledgements, the receiving station can send a BA acknowledging the receipt status of multiple data units sent by the transmitting station.

SUMMARY

Some embodiments of this disclosure include apparatuses and methods for implementing block acknowledgment (BA) operations for multi-link wireless communication networks such as a wireless local area network (WLAN). The BA operations for multi-link WLAN of the embodiments of this disclosure can assist the devices in the WLAN (e.g., an access point (AP), a station (STA)) to better utilize channel resources by, for example, avoiding duplicate retransmissions, reducing delays in acknowledgments, and/or adding independent operations on each link of the multi-link WLAN.

Some embodiments relate to an electronic device. The electronic device includes a transceiver configured to communicate over a wireless network and one or more processors communicatively coupled to the transceiver. The one or more processors transmit, using the transceiver and to a second electronic device, a first set of one or more frames on a first link and transmit, using the transceiver and to the second electronic device, a second set of one or more frames on a second link. The one or more processors further receive, using the transceiver and from the second electronic device, a first block acknowledgment (BA) frame on the first link and receive, using the transceiver and from the second electronic device, a second BA frame on the second link. The one or more processors further determine, based on received first BA frame and the second BA frame, a failed or missing frame of the first set of one or more frames transmitted on the first link.

Some embodiments relate to a method including transmitting, using a transceiver of a first electronic device and to a second electronic device, a first set of one or more frames on a first link and transmitting, using the transceiver of the first electronic device and to the second electronic device, a second set of one or more frames on a second link. The method further includes receiving, using the transceiver of the first electronic device and from the second electronic device, a first block acknowledgment (BA) frame on the first link and receiving, using the transceiver of the first electronic device and from the second electronic device, a second BA frame on the second link. The method further includes determining, based on received first BA frame and the second BA frame, a failed or missing frame of the first set of one or more frames transmitted on the first link and retransmitting, using the transceiver of the first electronic device and to the second electronic device, the failed or missing frame.

Some embodiments relate to a non-transitory computer-readable medium storing instructions. When the instructions are executed by a processor of an electronic device, the instructions cause the processor to perform operations including transmitting, to a second electronic device, a first set of one or more frames on a first link and a second set of one or more frames on a second link. The operations further include receiving, from the second electronic device, a first block acknowledgment (BA) frame on the first link and a second BA frame on the second link. The operations further include determining, based on received first BA frame and the second BA frame, one or more failed or missing frames, where each of the first and second BA frames includes a BA bitmap to indicate the one or more failed or missing frames.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
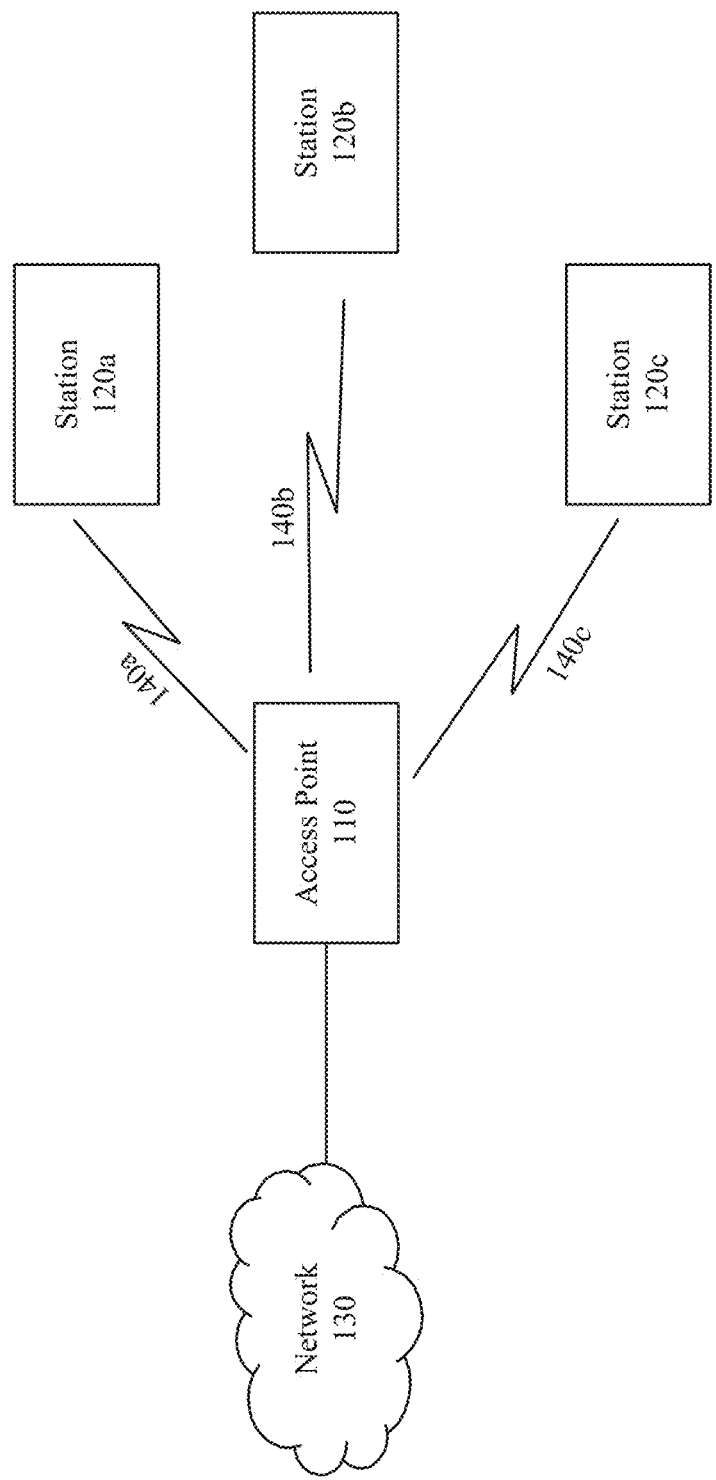
FIG. 1A illustrates an example system implementing BA operations in a multi-link communication network, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing block acknowledgment (BA) operations for multi-link wireless communication networks such as a wireless local area network (WLAN). The BA operations for multi-link WLAN of the embodiments of this disclosure can assist the devices in the WLAN (e.g., an access point (AP), a station (STA)) to better utilize channel resources by, for example, avoiding duplicate retransmissions, reducing delays in acknowledgments, and/or adding independent operations on each link of the multi-link WLAN.

According to some embodiments, the BA operations for multi-link WLAN can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, etc.). However, the embodiments of this disclosure can also be extended to block acknowledgment (BA) operations in other multi-link communication networks.

FIG. 1A illustrates an example system 100 implementing BA operations in a multi-link communication network, according to some embodiments of the disclosure. Example system 100 is provided for the purpose of illustration only and does not limit the disclosed embodiments. System 100 may include, but is not limited to, access point (AP) 110, stations (STA) 120, and network 130. Stations 120a-120c may include, but are not limited to, Wireless Local Area Network (WLAN) stations such as wireless communication devices, smart phones, laptops, desktops, tablets, personal assistants, monitors, televisions, wearable devices, and the like. Access point (AP) 110 may include but is not limited to WLAN electronic devices such as a wireless router, a wearable device (e.g., a smart watch), a wireless communication device (e.g., a smart phone), or a combination thereof.

Network 130 may be the Internet and/or a WLAN. Station 120's communications are shown as wireless communications 140. The communication between AP 110 and STA 120 can take place using wireless communications 140a-140c. The wireless communications 140a-140c can be based on a wide variety of wireless communication techniques. These techniques can include, but are not limited to, techniques based on IEEE 802.11 (such as, but not limited to IEEE 802.11ac, IEEE 802.11ax, IEEE 802.11bc, IEEE 802.11bd, IEEE 802.11be, IEEE 802.11v, etc. standards).

According to some embodiments, AP 110 and STAs 120 are configured to implement a multi-link communication. In other words, AP 110 and STAs 120 are configured to implement and support simultaneous or substantially simultaneous data transfer using multiple PHY links. For example, FIG. 1B illustrates an example multi-link communication between two stations, according to some embodiments of the disclosure.

Figure 1B:
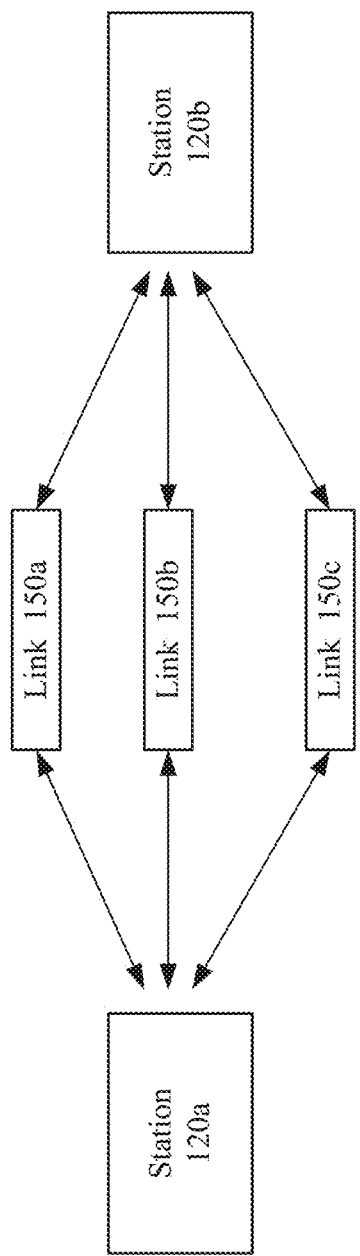
FIG. 1B illustrates an example multi-link communication between two stations, according to some embodiments of the disclosure.

As illustrated in FIG. 1B, STA 120a and STA 120b can communicate with each other using multiple links 150a-150c. In other words, STAs 120a and 120b can use multiple PHY links 150a-150c to simultaneously or substantially simultaneously transfer data. Although three links 150 are illustrated, the embodiments of this disclosure are not limited to this example and any number of links 150 can be implemented. The links 150 can include different wireless channels, according to some embodiments. For example, each wireless channel/link 150 can be defined based on its respective frequency that is different from the others. However, the embodiments of this disclosure are no limited to wireless channels and other PHY layer links can be used as links 150 for communication between STAs 120a and 120b.

In some embodiments, the communication between STAs 120a and 120b (and links 150) is direct communication (and direct links) between these STAs. Additionally or alternatively, the communication between STAs 120a and 120b (and links 150) is through AP 110. In this example, wireless communications 140a and 140b, as shown in FIG. 1A, can include links 150a-150c of FIG. 1B. Also, although links 150a-150c are shown as links between STAs 120a and 120b, the embodiments of this disclosure are not limited to this example. In some embodiments, the multi-link communication can be between AP 110 and a STA 120. Additionally or alternatively, the multi-link communication can be between two APs.

According to embodiments of this disclosure, STA 120a transmits data to STA 120b over multiple links 150. STA 120b is configured to send BA to STA 120a to indicate the status of received data. In some examples, STA 120a transmits multiple data units (e.g., medium access control (MAC) protocol data units (MPDUs) in an aggregate MPDU (A-MPDU)) over multiple links 150. STA 120b transmits one or more BA frames to STA 120a to indicate whether any of the data units were not received and/or were received with error. Depending on the received BA frame(s), STA 120a can determine which failed data units are to be retransmitted. Although some embodiments of this disclosure are discussed with respect to MPDUs and A-MPDUs, these embodiments are not limiting and other data units/frames can also be used by the transmitting STA to transmit data to the receiving STA.

The embodiments of this disclosure, as discussed in more detail below, assist STAs 120a and 120b to better utilize channel resources by, for example, avoiding duplicate retransmissions, reducing delays in acknowledgments, and/or adding independent operations on each link of multiple links 150a.

Figure 2:
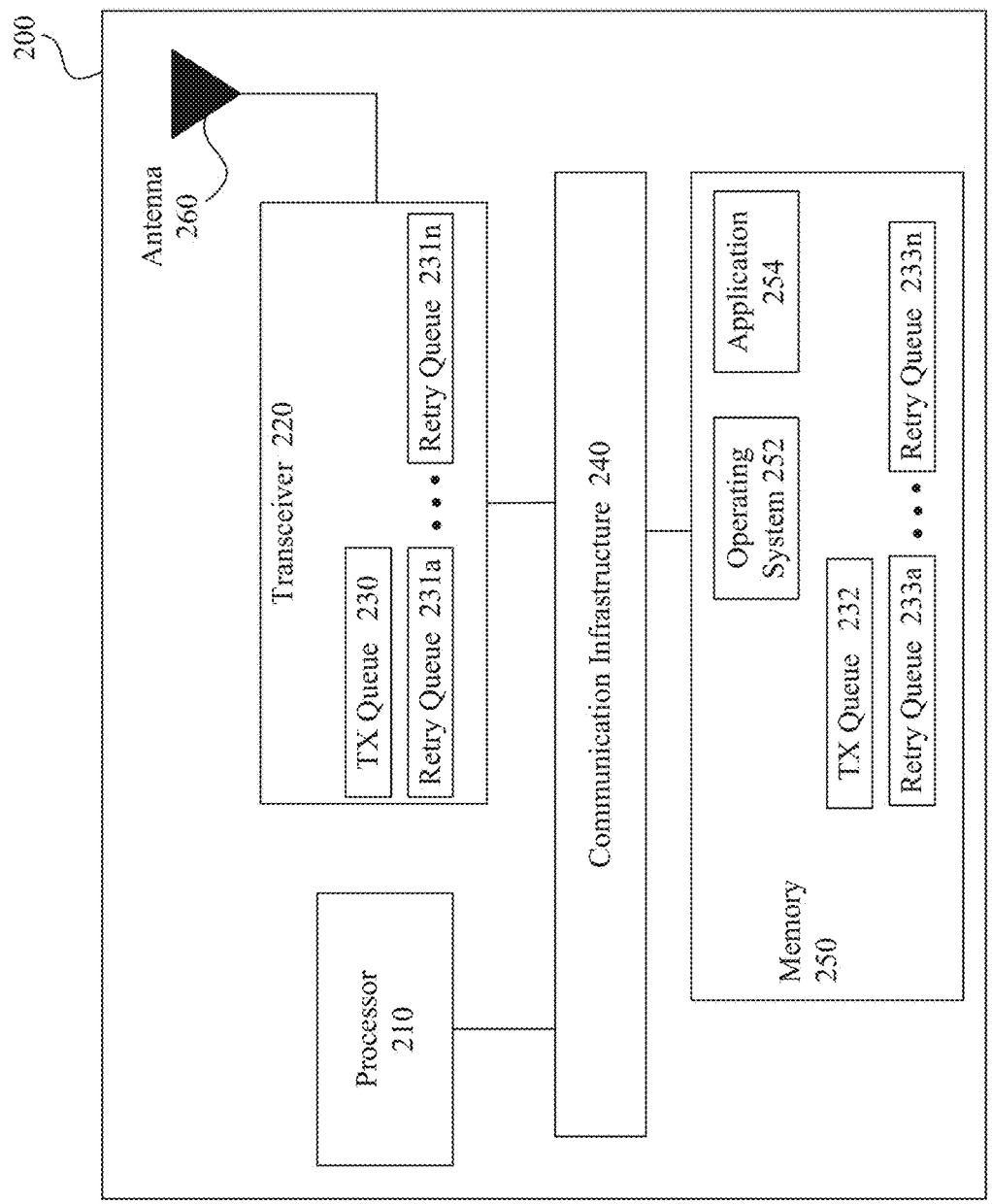
FIG. 2 illustrates a block diagram of an example wireless system of an electronic device implementing the block acknowledgment operations for multi-link communication network, according to some embodiments of the disclosure.

FIG. 2 illustrates a block diagram of an example wireless system 200 of an electronic device implementing the block acknowledgment operations for multi-link communication network, according to some embodiments of the disclosure. System 200 may be any of the electronic devices (e.g., AP 110, STA 120) of system 100. System 200 includes processor 210, transceiver 220, queues 230, 232, 231a-231n, and 233a-233n, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 performs operations enabling wireless system 200 of system 100 to implement the BA operations as described herein. Additionally or alternatively, transceiver 220 performs operations enabling wireless system 200 of system 100 to implement the BA operations as described herein.

Transceiver 220 transmits and receives communications signals that support the BA operations, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like.

Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, implements the BA operations in multi-link communication networks. For example, system 200 is configured to transmit data (e.g., MPDUs), receive BA frames, determine which MPDUs need to be retransmitted, and retransmit failed MPDUs. According to some embodiments, transceiver 220 can include transmit (TX) queue 230. TX queue can be configured to store the data (e.g., MPDUs) that transceiver 220 receives from other layers (of, for example, Open Systems Interconnection model (OSI model)) on system 200 to transmit to other STAs. Additionally transceiver 220 can also include one or more retry queues 231a-231n. Retry queues 231 can be used to store one or more MPDUs that need to be retransmitted. According to some embodiments, each retry queue 231 is associated with one link of the multi-link communication network. As a non-limiting example, STA 120a of FIG. 1B can have three retry queue 231, where each retry queue is associated with one link 150 of FIG. 1B.

Although some embodiments of this disclosure discuss the BA operations in accordance with queues at transceiver 220 (e.g., queues 230, 231a-231n), these queue can be located at other parts of system 200, such as a portion of memory 250 (e.g., queues 232 and 233a-233n).

According to some examples, processor 210, alone or in combination with transceiver 220 and/or memory 205 can receive the MPDUs to be transmitted to a receiving STA (e.g., STA 120b) from other layers (of, for example, OSI model) on system 200. For example, processor 210, alone or in combination with transceiver 220 and/or memory 205 can receive the MPDUs (or one or more A-MPDUs including MPDUs) from a MAC layer of system 200. Although some embodiments below are discussed with respect to processor 210 performing the operation, processor 210 can perform these operations alone or in combination with transceiver 220 and/or memory 205. Processor 210 can store the MPDUs in TX queue 230 for transmission to the receiving station. After transmitting one or more MPDUs, processor 210, using transceiver 220, receives a BA frame from the receiving STA. Based on the received BA frame, processor 210 can determine which MPDUs were successfully received at the receiving STA and which MPDUs failed.

Based on this determination, processor 210 stores the failed MPDUs in the retry queues 231. Later, processor 210 retransmits the failed MPDUs and transmits the queued MPDUs. As discussed in more detail below with respect to FIGS. 3-10, processor 210 can implement different BA operations in the multi-link communication network of FIGS. 1A, 1B, and 2.

Figure 3:
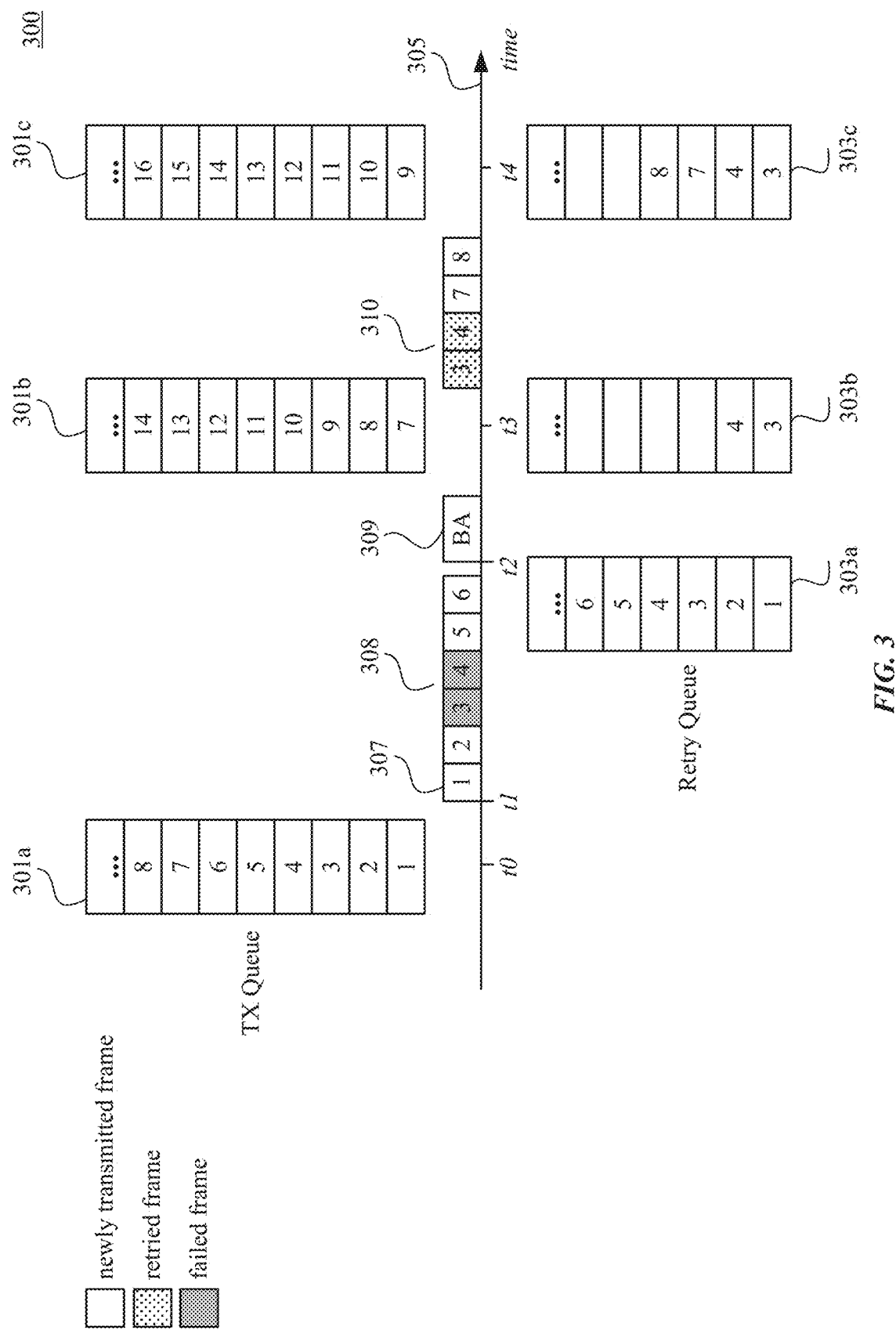
FIG. 3 illustrates example block acknowledgment operations between two stations, according to some embodiments of the disclosure.

FIG. 3 illustrates example block acknowledgment operations between two stations, according to some embodiments of the disclosure. Operation 300 of FIG. 3 illustrates a transmission (TX) queue 301, a retry queue 303, time axis 305, transmitted data 307, and block acknowledge (BA) frame 309. TX queue 301 and retry queue 303 are at the transmitting STA (e.g., STA 120a of FIG. 1B). Transmitted data (e.g., MPDUs) 307 are transmitted by the transmitting STA. BA frame 309 is transmitted by the receiving STA (e.g., STA 120b of FIG. 1B).

TX queue 301 is illustrated as TX queue 301a-301c to illustrate the data stored in TX queue 301 at different time instants (e.g., t0, t3, and t4). Similarly, retry queue 303 is illustrated as retry queues 303a-303c to illustrate the data stored in retry queue 303 at different time instants (e.g., t2, t3, and t4). This exemplary embodiment uses a single link between the transmitting and receiving STAs.

In this example, at time instant t0, TX queue 301a stores MPDUs with sequence numbers 1 through 8. At time instant t1, the transmitting STA transmits MPDUs 307 with sequence numbers 1 through 6. After transmitting these MPDUs, the transmitting STA stores the transmitted MPDUs in retry queue 303a until the transmitting STA can determine whether the transmission of any of these MPDUs failed.

At or around t2, the transmitting STA receives BA frame 309 from the receiving STA. From BA frame 309, the transmitting STA understands that MPDUs with sequence numbers 1, 2, 5, and 6 were successfully received, and determines that MPDUs with sequence numbers 3 and 4 failed based on their lack of acknowledgment in the BA. Accordingly, the transmitting STA updates its retry queue 303b at time instant t3 to store MPDUs 308 with sequence number 3 and 4. Additionally, TX queue 301b is also updated at t3 to remove the transmitted MPDUs and include MPDUs to be transmitted.

Next, the transmitting STA retransmits the failed MPDUs 310 from retry queue 303b and transmits other MPDUs from TX queue 301b. For example, the transmitting STA transmits MPDUs with sequence numbers 3, 4, 7, and 8. At t4, the transmitting STA further updates it TX queue 301c and its retry queue 303c.

Figure 4:
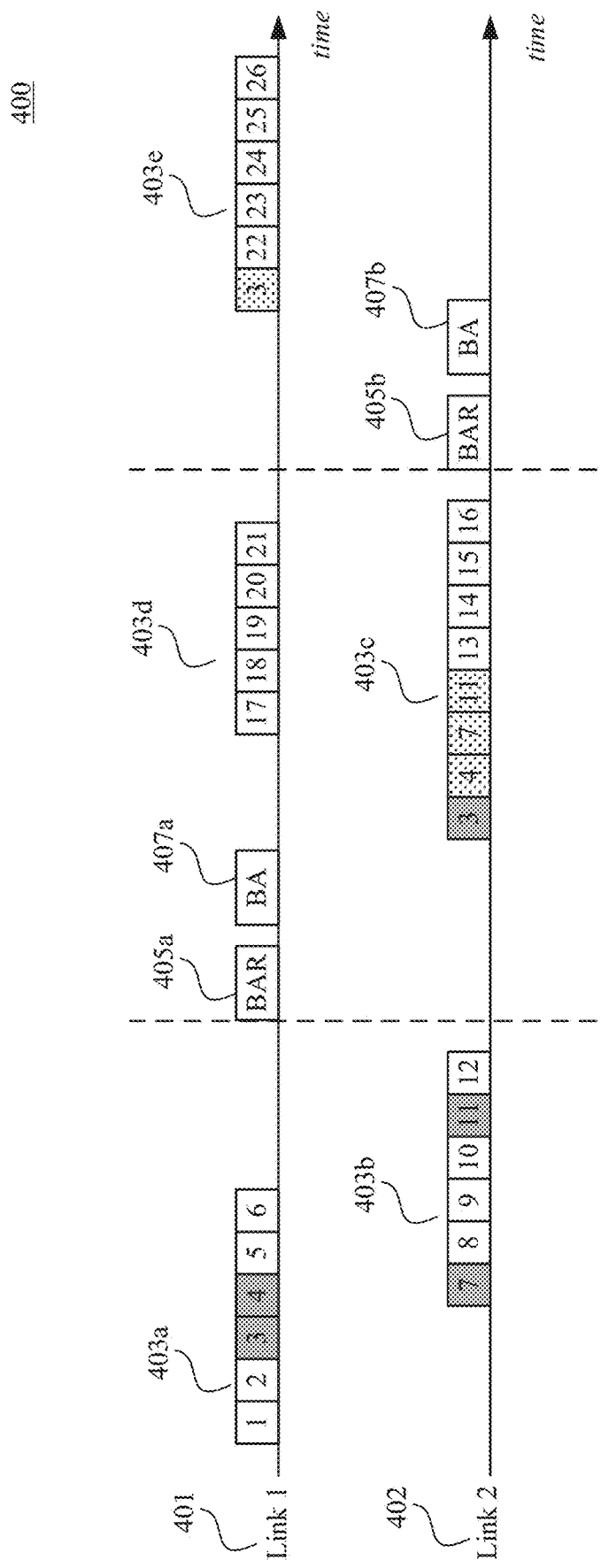
FIG. 4 illustrates an example block acknowledgment operation between two stations using two links, according to some embodiments of the disclosure.

FIG. 4 illustrates an example block acknowledgment operation between two stations using two links, according to some embodiments of the disclosure. Operation 400 of FIG. 4 illustrates time axes for two links 401 and 402, transmitted data (e.g., MPDUs) 403, block acknowledgment request (BAR) frame 405, and block acknowledgment (BA) frame 407.

In this exemplary embodiment, the transmitting and receiving STAs (not shown—e.g., STAs 120a and 120b) communicate with each other using two links 401 and 402. The transmitting STA (e.g., STA 120a) transmits data to the receiving STA (e.g., STA 120b). In some examples the data are transmitted using A-MPDU 403 that includes one or more MPDUs that are aggregated together. For example, A-MPDU 403a includes MPDUs with sequence numbers 1 through 6. In this example, the transmitting STA transmits A-MPDU 403a on link 401. The transmitting STA also transmits A-MPDU 403b including MPDUs with sequence numbers 7 through 12 over link 402. In this example, the transmission of A-MPDUs 403b partially overlaps the transmission of A-MPDUs 403a in time.

After the transmissions of A-MPDUs 403a and 403b, the transmitting STA transmits a BAR frame 405a. In response, the receiving STA transmits BA frame 407a. Using the BA frame 407a, the transmitting STA can determine that the transmission of MPDUs with sequence numbers 3, 4, 7, and 11 failed. In some examples, BA frame 407a can include information indicating that MPDUs with sequence numbers 1, 2, 5, 6, 8, 9, 10, and 12 were successfully received. Using this information, the transmitting STA determines the MPDUs whose transmission failed (e.g., sequence numbers 3, 4, 7, 11). In this example, BAR frame 405a is transmitted on link 401 and BA frame 407a is also transmitted on link 401.

Based on the feedback received, the transmitting STA can retransmit the failed and/or the missing MPDUs and transmit additional MPDUs that are in its TX queue. For example, the transmitting STA transmits A-MPDU 403c on link 402 and A-MPDU 403d on link 401. In this example, A-MPDU 403c can include failed and/or missing MPDUs with sequence numbers 3, 4, 7, and 11, and additional MPDUs with sequence numbers 13 through 16. Also, A-MPDU 403d can include MPDUs 17 through 21. In this example, the transmission of A-MPDUs 403d partially overlaps, in time, the transmission of A-MPDUs 403c.

After the transmissions of A-MPDUs 403c and 403d, the transmitting STA transmits a BAR 405b. In response, the receiving STA transmits BA frame 407b. Using the BA frame 407b, the transmitting STA can determine that the retransmission of MPDU with sequence number 3 failed again. In this example, BAR frame 405b is transmitted on link 402 and BA frame 407b is also transmitted on link 402. Based on the feedback received, the transmitting STA can retransmit the failed MPDU and transmit the MPDUs that are in its TX queue. For example, the transmitting STA transmits A-MPDU 403e. In this example, A-MPDU 403e can include failed MPDU with sequence number 3, and MPDUs with sequence numbers 22 through 26.

According to some embodiments, the acknowledgement policy used by the BA session is communicated to the receiving STA using the quality of service (QoS) control field of MAC header of the MPDUs and indicates the use of block acknowledgment.

According to some examples, the transmitting STA can determine which one of links 401 or 402 to transmit the BAR frame on based on the quality of links 401 and 402 (for example, but not limited to, link delay, signal to noise ratio (SNR) of the link, link error, etc.) In response, the receiving STA can send the BA frame on the same link that the transmitting STA sent the BAR frame. Additionally or alternatively, the receiving STA can use the quality of the links to determine which link to use to send BA frame.

According to some embodiments, the transmitting STA transmits the BAR frame when all links are clear (e.g., no data is being transmitted on the links). For example, the transmitting STA can coordinate the transmission such that no data is being transmitted on the links for the same BA session while the transmitting STA is sending the BAR frame. Additionally or alternatively, the transmitting STA can transmit the BAR frame when a BA window has been exhausted. The size of the BA window is the maximum number of frames (e.g., MPDUs) that are outstanding and are waiting for acknowledgement. In other words, when the size of the BA window exceeds a threshold, the transmitting STA can transmit its BAR frame.

The block acknowledgment operation 400 that uses two links 401 and 402 can be extended to any number of links. According to some embodiments, block acknowledgment operation 400 can better utilize channel resources by, for example, avoiding duplicate retransmissions and/or reducing delays in acknowledgments.

Figure 5A:
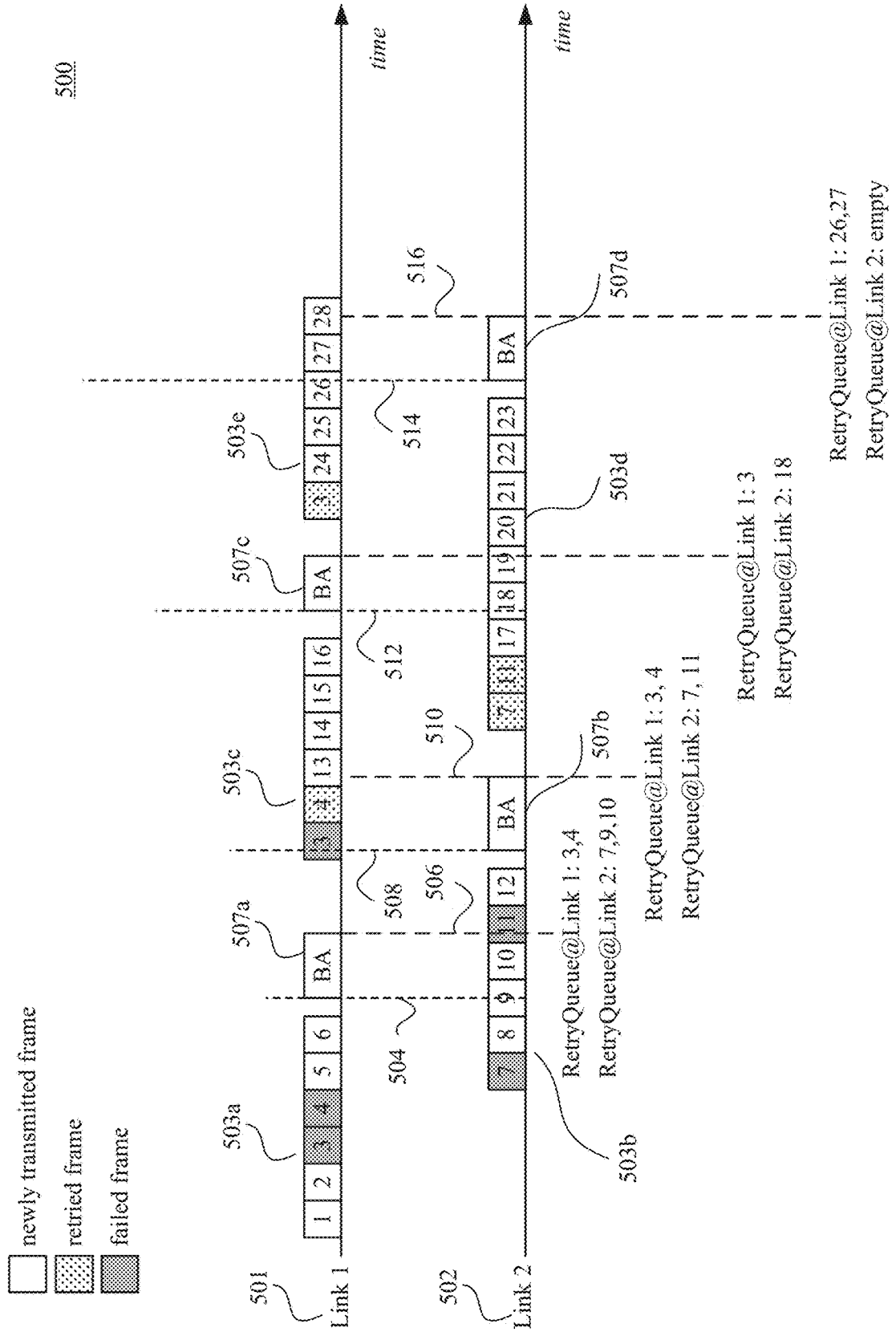
FIG. 5A illustrates another example block acknowledgment operation between two stations using two links, according to some embodiments of the disclosure.

FIG. 5A illustrates another example block acknowledgment operation between two stations using two links, according to some embodiments of the disclosure. Operation 500 of FIG. 5A illustrates time axes for two links 501 and 502, transmitted data (e.g., MPDUs) 503, and block acknowledgment (BA) frame 507.

In some exemplary embodiments, the transmitting STA includes one or more retry queues—one retry queue associated to each link. In the exemplary embodiment of FIG. 5A, the transmitting STA includes two retry queues (e.g., retry queue 233 of FIG. 2)—retry queue1 associated to link 501 and retry queue2 associated to link 502.

In this exemplary embodiment, the transmitting and receiving STAs (not shown—e.g., STAs 120a and 120b) communicate with each other using two links 501 and 502. The transmitting STA (e.g., STA 120a) transmits data to the receiving STA (e.g., STA 120b). In some examples the data are transmitted using A-MPDU 503 that includes one or more MPDUs that are aggregated together. For example, A-MPDU 503a includes MPDUs with sequence numbers 1 through 6. In this example, the transmitting STA transmits A-MPDU 503a on link 501. The transmitting STA also transmits A-MPDU 503b including MPDUs with sequence numbers 7 through 12 over link 502. In this example, the transmission of A-MPDUs 503b partially overlaps the transmission of A-MPDUs 503a.

In this example, after the transmitting STA transmits A-MPDU 503a on link 501 and while the transmitting STA is transmitting A-MPDU 503b, the receiving STA transmits BA frame 507a. The receiving STA transmits BA frame 507a after the transmission of A-MPDU 503a is ended. The receiving STA transmits BA frame 507a on link 501 where A-MPDU 503a was transmitted. The transmission of BA frame 507a is started at time instant 504 and is ended at time instant 506. BA frame 507a can indicate that the MPDUs with sequence numbers 1, 2, 5, 6, and 8 were successfully received at the receiving STA. The MPDUs missing or failed based on BA frame 507a include MPDUs with sequence numbers 3, 4, 7, 9, and 10. In this example, MPDUs with sequence numbers 9 and 10 are shown missing because transmission of BA frame 507a started and ended while MPDUs with sequence numbers 9 and 10 were being transmitted in A-MPDU 503b.

In this exemplary embodiment, the failed or missing MPDUs with sequence numbers 3 and 4, which were transmitted on link 501, are stored in the retry queue1 associated with link 501. Similarly, the failed or missing MPDUs with sequence numbers 7, 9, 10, which were transmitted on link 502, are stored in retry queue2 associated with link 502.

Based on the feedback received, the transmitting STA can retransmit the failed and/or the missing MPDUs and transmit the MPDUs that are in its TX queue. In this example, the transmitting STA retransmits the failed or missing MPDUs from the retry queues on the link associated with the retry queue. For example, the transmitting STA transmits A-MPDU 503c. In this example, A-MPDU 503c can include failed or missing MPDUs with sequence numbers 3 and 4, and MPDUs with sequence numbers 13 through 16. A-MPDU 503c is transmitted on link 501 and therefore, failed or missing MPDUs with sequence numbers 3 and 4 that are stored in retry queue1 associated with link 501 are retransmitted in A-MPDU 503c. Failed or missing MPDUs with sequence numbers 7, 9, 10, which are stored in retry queue2 associated with link 502 are not transmitted in A-MPDU 503c, according to this example.

In this example, after the transmitting STA transmits A-MPDU 503b on link 502 and while the transmitting STA is transmitting A-MPDU 503c on link 501, the receiving STA transmits BA frame 507b. The receiving STA transmits BA frame 507b after the transmission of A-MPDU 503b is ended. The transmission of BA frame 507b is started at time instant 508 and is ended at time instant 510. The receiving STA transmits BA frame 507b on link 502 where A-MPDU 503b was transmitted. In this example, BA frame 507b can indicate that MPDUs with sequence numbers 9, 10, and 12 were successfully received. Based on this feedback, the transmitting STA determines that MPDUs with sequence numbers 3, 4, 7, and 11 failed or are missing. The transmitting STA determines that MPDUs with sequence numbers 3 and 4 are missing because the transmission of BA frame 507b started and ended while MPDUs with sequence numbers 3 and 4 were being retransmitted in A-MPDU 503c.

In this example, the MPDUs with sequence numbers 3 and 4, which were transmitted on link 501, are stored in retry queue1 associated with link 501. And the MPDUs with sequence numbers 7 and 11, which were transmitted on link 502, are stored in retry queue 2 associated with link 502.

Based on the feedback received, the transmitting STA can retransmit the failed and/or the missing MPDUs and transmit the MPDUs that are in its TX queue. In this example, the transmitting STA retransmits the failed or missing MPDUs from the retry queue on the link associated with the retry queue. For example, the transmitting STA transmits A-MPDU 503d. In this example, A-MPDU 503d can include failed or missing MPDUs with sequence numbers 7 and 11, and MPDUs with sequence numbers 17 through 23. A-MPDU 503d is transmitted on link 502 and therefore, failed or missing MPDUs with sequence numbers 7 and 11 that are stored in retry queue2 associated with link 502 are retransmitted in A-MPDU 503d. Failed or missing MPDUs with sequence numbers 3 and 4, which are stored in retry queue1 associated with link 501 are not transmitted in A-MPDU 503d, according to this example. Accordingly, in this example, the transmitting STA retransmits the failed or missing MPDUs exclusively from the retry queue on the link associated with the retry queue.

In this example, after the transmitting STA transmits A-MPDU 503c on link 501 and while the transmitting STA is transmitting A-MPDU 503d, the receiving STA transmits BA frame 507c. The receiving STA transmits BA frame 507c after the transmission of A-MPDU 503c is ended. The transmission of BA frame 507c is started at time instant 512 and is ended at time instant 514. The receiving STA transmits BA frame 507c on link 501 where A-MPDU 503c was transmitted. In this example, BA frame 507c can indicate that MPDUs with sequence numbers 4, 7, 11, 13-17 are successfully received. Based on this feedback, the transmitting STA determines that MPDUs with sequence numbers 3 and 18 failed or are missing. The transmitting STA determines that MPDU with sequence number 18 failed or is missing because the transmission of BA frame 507c started and ended while MPDU with sequence number 18 was being transmitted in A-MPDU 503d.

In this example, the MPDU with sequence number 3, which was transmitted on link 501, is stored in retry queue1 associated with link 501. And the MPDU with sequence number 18, which was transmitted on link 502, are stored in retry queue 2 associated with link 502.

Based on the feedback received, the transmitting STA can retransmit the failed and/or the missing MPDUs and transmit the MPDUs that are in its TX queue. In this example, the transmitting STA retransmits the failed or missing MPDUs from the retry queues on the link associated with the retry queue. For example, the transmitting STA transmits A-MPDU 503e. In this example, A-MPDU 503e can include failed or missing MPDU with sequence number 3, and MPDUs with sequence numbers 24 through 28. A-MPDU 503e is transmitted on link 501 and therefore, failed or missing MPDU with sequence number 3 that is stored in retry queue1 associated with link 501 is retransmitted in A-MPDU 503e. Failed or missing MPDU with sequence number 18, which is stored in retry queue2 associated with link 502, is not transmitted in A-MPDU 503e, according to this example.

In this example, after the transmitting STA transmits A-MPDU 503d on link 502 and while the transmitting STA is transmitting A-MPDU 503e, the receiving STA transmits BA frame 507d. The receiving STA transmits BA frame 507d after the transmission of A-MPDU 503d is ended. The receiving STA transmits BA frame 507d on link 502 where A-MPDU 503d was transmitted. The transmission of BA frame 507d can start at time instant 516 and end at time instant 518. In this example, BA frame 507d can indicate that MPDUs with sequence numbers 3, 18-25 are successfully received. Based on this feedback, the transmitting STA determines that MPDUs with sequence numbers 26 and 27 failed or are missing. The transmitting STA determines that MPDUs with sequence numbers 26 and 27 failed or are missing because the transmission of BA frame 507d started and ended while transmitted while MPDUs with sequence numbers 26 and 27 were being transmitted in A-MPDU 503d. This method can further continue similarly as discussed above.

As discussed above, in the embodiments of FIG. 5A, the retransmission is performed on a per link basis and the transmitting STA has retry queues where each retry queue is associated with one specific link. According to some embodiments, the retry queues in the transmitting STA are not shared. According to some embodiments, the acknowledgement policy used by the BA session is communicated to the receiving STA using the quality of service (QoS) control field of MAC header of the MPDUs and indicates the use of implicit block acknowledgment request in QoS control.

In some embodiments, when the BA frame (e.g., one or more frames 507 of FIG. 5A) is received at the transmitting STA, the transmitting STA (using, for example, MAC layer processes) can release the packets in the per-link retry queues that are indicated received in the BA bitmap of the BA frame. According to some embodiments, the BA frame contains a bitmap configured to indicate the status of MPDUs. In other words, each bit of the BA bitmap can represent the status (e.g., success, missing or failure) of an MPDU. The BA frame can use other ways to also indicate the status of the MPDUs.

According to some embodiments, during or after channel access, an A-MPDU aggregation engine (not shown, but can be included in processor 210 and/or transceiver 220 of FIG. 2) of the transmitting STA can fetch the new packets to be transmitted from the transmission queue (e.g., TX queue 230 and/or 232) and the packets to be retransmitted from per-link retry queues (e.g. retry queues 231 and/or 233) to create the A-MPDU (e.g., A-MPDUs 503). After creating the A-MPDU, the aggregation engine of the transmitting STA can put the new packets that were included in the A-MPDU in the associated per-link retry queue (associated with the link on which the A-MPDU is transmitted).

In some embodiments, the receiving STA can include a single shared BA reordering buffer and a share scoreboard for all the links. After finishing receiving an A-MPDU, the receiving STA generates the BA frame. The BA frame can contain the BA bitmap (e.g., indicating the missing or failed MPDUs) of all the links at the time of the creation of the BA frame.

The block acknowledgment operation 500 that uses two links 501 and 502 can be extended to any number of links. According to some embodiments, block acknowledgment operation 500 can better utilize channel resources by, for example, avoiding duplicate retransmissions and/or reducing delays in acknowledgments. In some examples, the acknowledgment feedback can be immediate or substantially immediate. Additionally or alternatively, block acknowledgment operation 500 can reduce or eliminate air time waste.

Figure 5B:
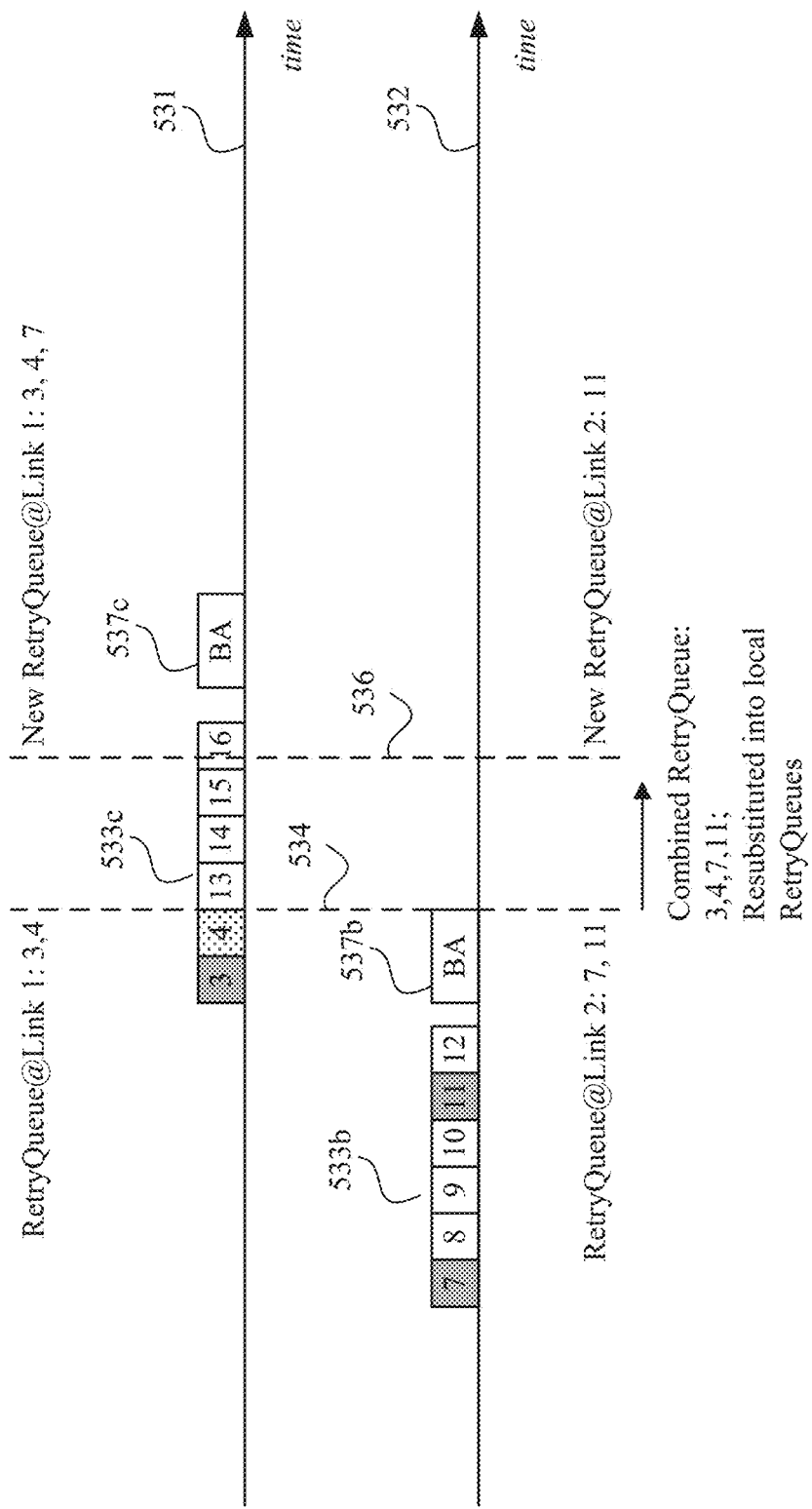
FIG. 5B illustrates another example block acknowledgment operation between two stations using two links, according to some embodiments of the disclosure.

FIG. 5B illustrates another example block acknowledgment operation between two stations using two links, according to some embodiments of the disclosure. Operation 530 of FIG. 5B illustrates time axes for two links 531 and 532, transmitted data (e.g., MPDUs) 533, and block acknowledgment (BA) frame 537.

Block acknowledgment operation 530 of FIG. 5B is similar to block acknowledgment operation 500 of FIG. 5A. In operation 530, and according to some embodiments, the transmitting STA can combine and reshuffle the per-link retry queues (e.g., retry queues 231 and 233 of FIG. 2) such that certain MPDUs that have transmission failures on a particular link, for example, link 531, can be retransmitted on link 532.

According to one exemplary embodiment illustrated in FIG. 5B, the transmitting STA transmits A-MPDU 533b, which includes MPDUs with sequence numbers 7 through 12, on link 532. After receiving A-MPDU 533b (or part of it), the receiving STA transmits BA frame 537b on link 532. Based on BA frame 537b, the transmitting STA determines that MPDUs with sequence numbers 7 and 11 failed or were missing. The transmitting STA stores MPDUs with sequence numbers 7 and 11 in the retry queue associated with link 532.

In this example, MPDUs with sequence numbers 3 and 4 were previously failed or were missing (now being retransmitted using A-MPDU 533c). Therefore, MPDUs with sequence numbers 3 and 4 are stored in the retry queue associated with link 531.

In this exemplary embodiment, the transmitting STA, between time instants 534 and 536 decides to combine and reshuffle the MPDUs on the retry queues—for example, MPDUs with sequence numbers 3 and 4 on retry queue associated with link 531 and MPDUs with sequence numbers 7 and 11 on retry queue associated with link 532. In this example, the retry queues are updated at time instant 536. At time instant 536, the retry queue associated with link 531 includes MPDUs with sequence numbers 3, 4, and 7 and the retry queue associated with link 532 includes MPDU with sequence number 11. Operation 530 can further proceed similar to operation 500 of FIG. 5A.

According to some embodiments, the timing of and how the retry queues are combined and reshuffled are implementation specific. In some examples, the transmitting STA can combine the retry MPDUs in the retry queues and redistribute the retry MPDUs into the retry queue between receiving the BA frames. According to some embodiments, the redistribution can be based on the status of the links, the status of the retry queues, the size of the retry queues, etc. For example, if one link is experiencing more delay, noise, and/or errors, the transmitting STA can redistribute the MPDUs in the retry queue associated with that link to the retry queue associated with other links.

Figure 6:
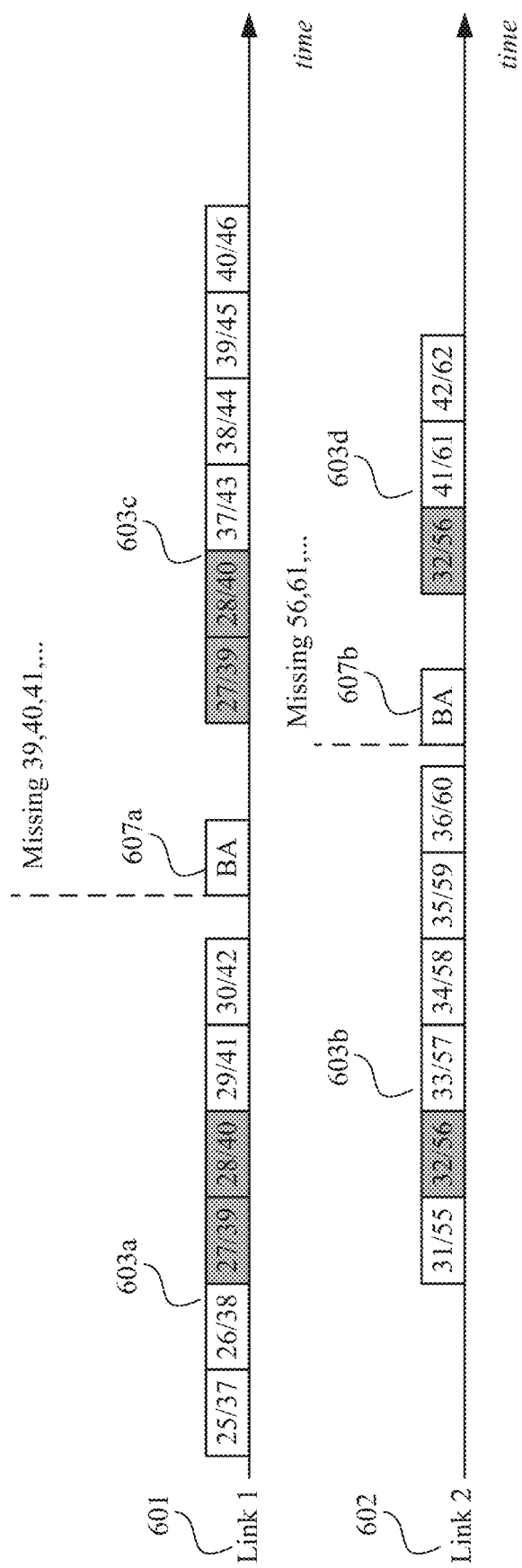
FIG. 6 illustrates another example block acknowledgment operation between two stations using two links and using sub-BA sessions, according to some embodiments of the disclosure.

FIG. 6 illustrates another example block acknowledgment (BA) operation between two stations using two links and using sub-BA sessions, according to some embodiments of the disclosure. Operation 600 of FIG. 6 illustrates time axes for two links 601 and 602, transmitted data (e.g., MPDUs) 603, and block acknowledgment (BA) frame 607.

According to some embodiments, and as illustrated in FIG. 6, a block acknowledgment (BA) session between the transmitting STA and the receiving STA is composed of a plurality of sub-BA sessions. In some examples, each sub-BA session is associated with one link. According to some examples, each sub-BA session on each link has its own sequence number space, its own per-link retry queue, and its per-link scoreboard. In some examples, the scoreboards are not shared between the sub-BA sessions of the BA session. For example, as illustrated in FIG. 6, a first sub-BA session associated with the link 601 has MDPUs with sequence numbers 37, 38, 39, 40, 41, 42, . . . . A second sub-BA session associated with link 603 has MPDUs with sequence numbers 55, 56, 57, 58, 59, 60, . . . . According to some embodiments, parameters associated with the sub-BA sessions are negotiable. For example, the transmitting STA and the receiving STA can negotiate the parameters of the BA sub-sessions.

According to some embodiments, the transmitting STA assigns sequence numbers per link and performs retransmission per link. For example, the transmitting STA can assign per-link sequence numbers to a QoS data frame. Additionally, or alternatively, the transmitting STA can define or use a new high efficiency (HE) A-Control field of the MAC header of the MPDU for the per-link sequence numbers and to carry the new per-link sequence number. In some examples, the sequence number in QoS control can be used to help move the window for the BA session. The transmitting STA maintains per-link retry queues, according to some examples.

On the receiving side, the receiving STA can be configured to generate BA frames per link. For example, the receiving STA can generate and transmit the BA frames for each link and associated to that link. In this example, the retransmission by the transmitting STA can be done at the local link using per-link scoreboard. In this example, the BA bitmap can be local to the link to indicate the per-link sequence number for MPDUs that are not received.

According to some embodiments, the receiving STA can have both per-link reordering buffer (using per-link sequence number) and a shared reordering buffer for received MPDUs from all the sub-BA sessions (using sequence number). According to some embodiments, the sub-BA session can have its own negotiation for session parameters, such as, but not limited to, buffer size per link. In some examples, a sub-BA session can be added or removed from a BA session.

In this exemplary embodiment, the transmitting and receiving STAs (not shown—e.g., STAs 120a and 120b) communicate with each other using two links 601 and 602. The transmitting STA (e.g., STA 120a) transmits data to the receiving STA (e.g., STA 120b). In some examples the data are transmitted using A-MPDU 603 that includes one or more MPDUs. For example, A-MPDU 603a includes MPDUs with sequence numbers 25/37 through 30/42. In this example, the transmitting STA transmits A-MPDU 603a on link 601. The transmitting STA also transmits A-MPDU 603b including MPDUs with sequence numbers 31/55 through 36/60 over link 602. In this example, the transmission of A-MPDUs 603b partially overlaps the transmission of A-MPDUs 603a.

After receiving A-MPDU 603a (or part of it), the receiving STA transmits BA frame 607a on link 601. In this example, and based on BA frame 607a, the transmitting STA determines that MPDUs with sequence numbers 39 and 40 failed or were missing. Additionally, the receiving STA transmits BA frame 607b on link 602 in response to A-MPDU 603b. In this example, and based on BA frame 607b, the transmitting STA determines that MPDU with sequence number 56 failed or was missing.

In response, the transmitting STA can send A-MPDU 603c, which includes the MPDUs with sequence numbers 27/39, 28/40, and 37/43 through 40/46, where the MPDUs with sequence numbers 27/39 and 28/40 are retransmitted MPDUs. Also, the transmitting STA can send A-MPDU 603d, which includes the MPDUs with sequence numbers 32/56 and 41/61 through 42/62, where the MPDU with sequence number 32/56 is a retransmitted MPDU.

The block acknowledgment operation 600 that uses two links 601 and 602 can be extended to any number of links. According to some embodiments, block acknowledgment operation 600 can better utilize channel resources by, for example, avoiding duplicate retransmissions, reducing delays in acknowledgments, and/or using independent BA operation on each link.

Figure 7A:
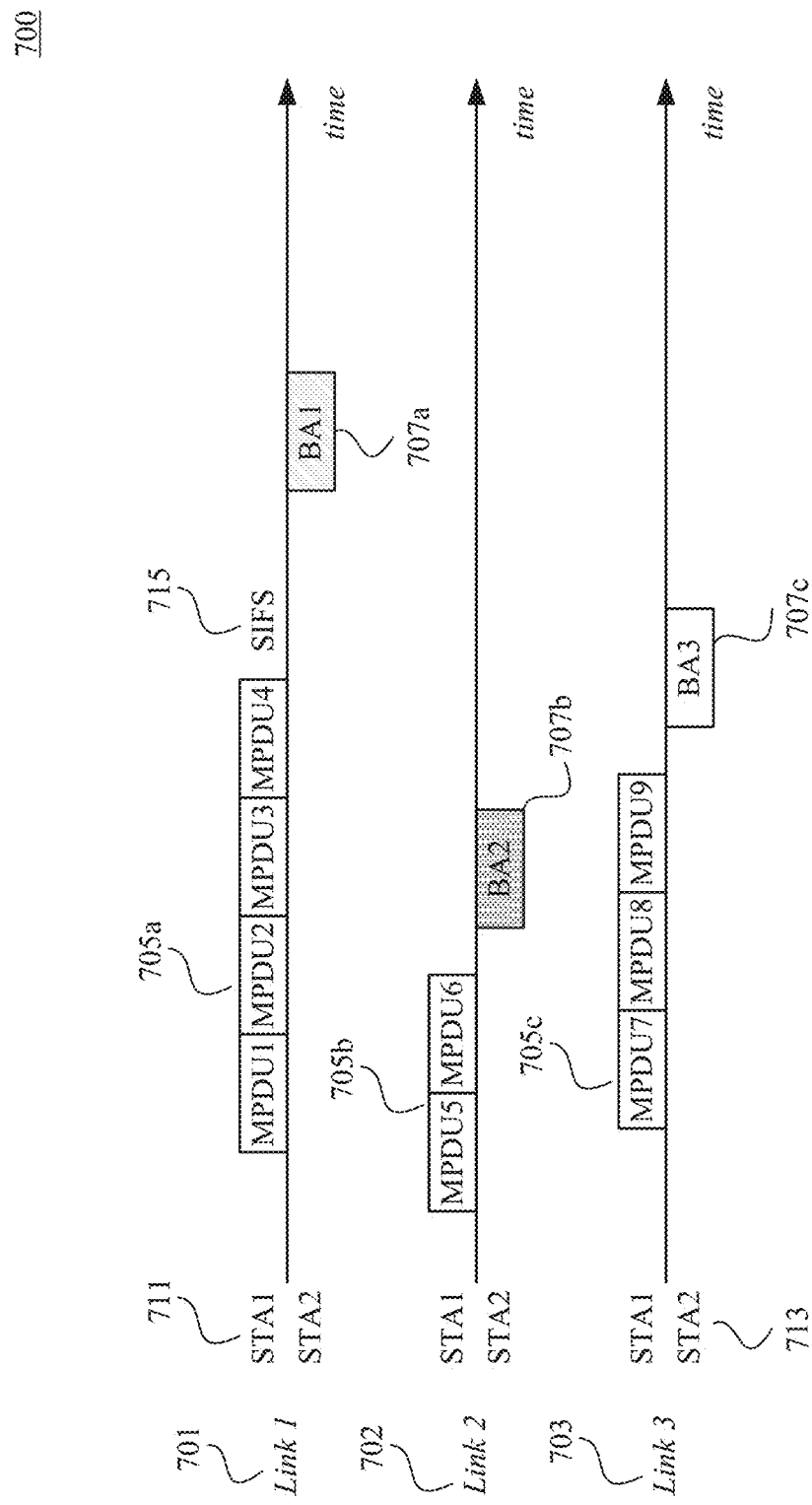
FIG. 7A illustrates another example block acknowledgment operation between two stations using three links, according to some embodiments of the disclosure.

FIG. 7A illustrates another example block acknowledgment operation between two stations using three links, according to some embodiments of the disclosure. Operation 700 of FIG. 7A illustrates time axes for three links 701-703, transmitted data (e.g., MPDUs) 705, and block acknowledgment (BA) frame 707.

In this example, the transmitting STA (e.g., transmitting STA 711) can store, for each transmitted MPDU, the link on which the MPDU was transmitted. In some examples, the transmitting STA can store this information in a transmission queue (e.g., TX queue 230 and/or 232) and/or in one or more retry queues (e.g., retry queues 231a/233a-231n/233n). In some examples, the transmitting STA can store this information in addition to the MPDU payload and MAC header.

In this exemplary embodiment, the transmitting STA 711 and receiving STA 713 communicate with each other using three links 701-703. The transmitting STA 711 (e.g., STA 120a) transmits data to the receiving STA 713 (e.g., STA 120b). In some examples the data are transmitted using A-MPDU 705 that includes one or more MPDUs. The receiving STA 713 transmits BA frame 707 in response A-MPDU 705. According to some embodiments, and as illustrated in FIG. 7A, the transmitting STA 711 considers a feedback of failed or missing MPDU from a BA frame received on the same link that the MPDU was transmitted. In other words, the transmitting STA 711 does not consider the feedback of failed or missing MPDU from a BA frame received on a link different from the link on which the MPDU was transmitted.

For example, as illustrated in FIG. 7A, transmitting STA 711 transmits A-MPDU 705a including MPDUs with sequence numbers 1 through 4 on link 701. After a time 715, the receiving STA 713 transmits BA frame 707a on link 701. Transmitting STA 711 considers the feedback of failed or missing MPDU with sequence numbers 1-4 from BA frame 707a. Transmitting STA 711 will ignore the feedback of failed or missing MPDU with sequence numbers 1-4 that it may receive from BA frame 707b on link 702 and/or from BA frame 707c on link 703. In some examples, transmitting STA 711 may retransmit the failed MPDUs after transmitting STA 711 has received BA frame 707a or when a BA timeout for BA frame 707a has elapsed. In some embodiments, transmitting STA 711 will consider the feedback of successful transmission from any BA frame received on any link on which transmitting STA 711 operates. In other words, transmitting STA 711 will consider the feedback of successful transmission of MPDUs with sequence number 1-4 from BA frame 707b on link 702 and/or BA frame 707c on link 703.

According to some embodiments, the feedback of failed or missing MPDU can be in form of value 0 in the BA bitmap of the BA frame. In these examples, the value 0 indicates that the reception of the MPDU failed and MPDU to be retransmitted. Additionally or alternatively, the feedback of successful MPDU can be in form of value 1 in the BA bitmap of the BA frame.

According to some embodiments, if transmitting STA 711 does not receive a BA frame at a BA timeout in the same channel that the A-MPDU was transmitted, then transmitting STA 711 may retransmit the A-MPDU. Alternatively, transmitting STA 711 may transmit a BAR frame and request BA frame retransmission.

Continuing with the example of FIG. 7A, transmitting STA 711 transmits A-MPDU 705b including MPDUs with sequence numbers 5 through 6 on link 702. After a processing time, the receiving STA 713 transmits BA frame 707b on link 702. Transmitting STA 711 considers the feedback of failed or missing MPDU with sequence numbers 5-6 from BA frame 707b. Transmitting STA 711 will ignore the feedback of failed or missing MPDU with sequence numbers 5-6 that it may receive from BA frame 707a on link 701 and/or from BA frame 707c on link 703. In some embodiments, transmitting STA 711 will consider the feedback of successful transmission from any BA frame received on any link on which transmitting STA 711 operates. In other words, transmitting STA 711 will consider the feedback of successful transmission of MPDUs with sequence number 5-6 from BA frame 707a on link 701 and/or BA frame 707c on link 703.

Similarly, transmitting STA 711 transmits A-MPDU 705c including MPDUs with sequence numbers 7 through 9 on link 703. After a processing time, the receiving STA 713 transmits BA frame 707c on link 703. Transmitting STA 711 considers the feedback of failed or missing MPDU with sequence numbers 7-9 from BA frame 707c. Transmitting STA 711 will ignore the feedback of failed or missing MPDU with sequence numbers 7-9 that it may receive from BA frame 707a on link 701 and/or from BA frame 707b on link 702. In some embodiments, transmitting STA 711 will consider the feedback of successful transmission from any BA frame received on any link on which transmitting STA 711 operates. In other words, transmitting STA 711 will consider the feedback of successful transmission of MPDUs with sequence number 7-9 from BA frame 707a on link 701 and/or BA frame 707b on link 702.

The block acknowledgment operation 700 that uses three links 701-703 can be extended to any number of links. According to some embodiments, block acknowledgment operation 700 can better utilize channel resources by, for example, avoiding duplicate retransmissions and/or reducing delays in acknowledgments. In some examples, the operation 700 of FIG. 7A is simple to implement and no precise timing between MPDUs may be needed. According to some embodiments, the operation 700 can allow the transmitting STA to release memory faster, which may increase the transmission rate. Also, the operation 700 can solve the problems with asynchronous transmissions in multiple links and synchronous transmissions of multiple links.

Figure 7B:
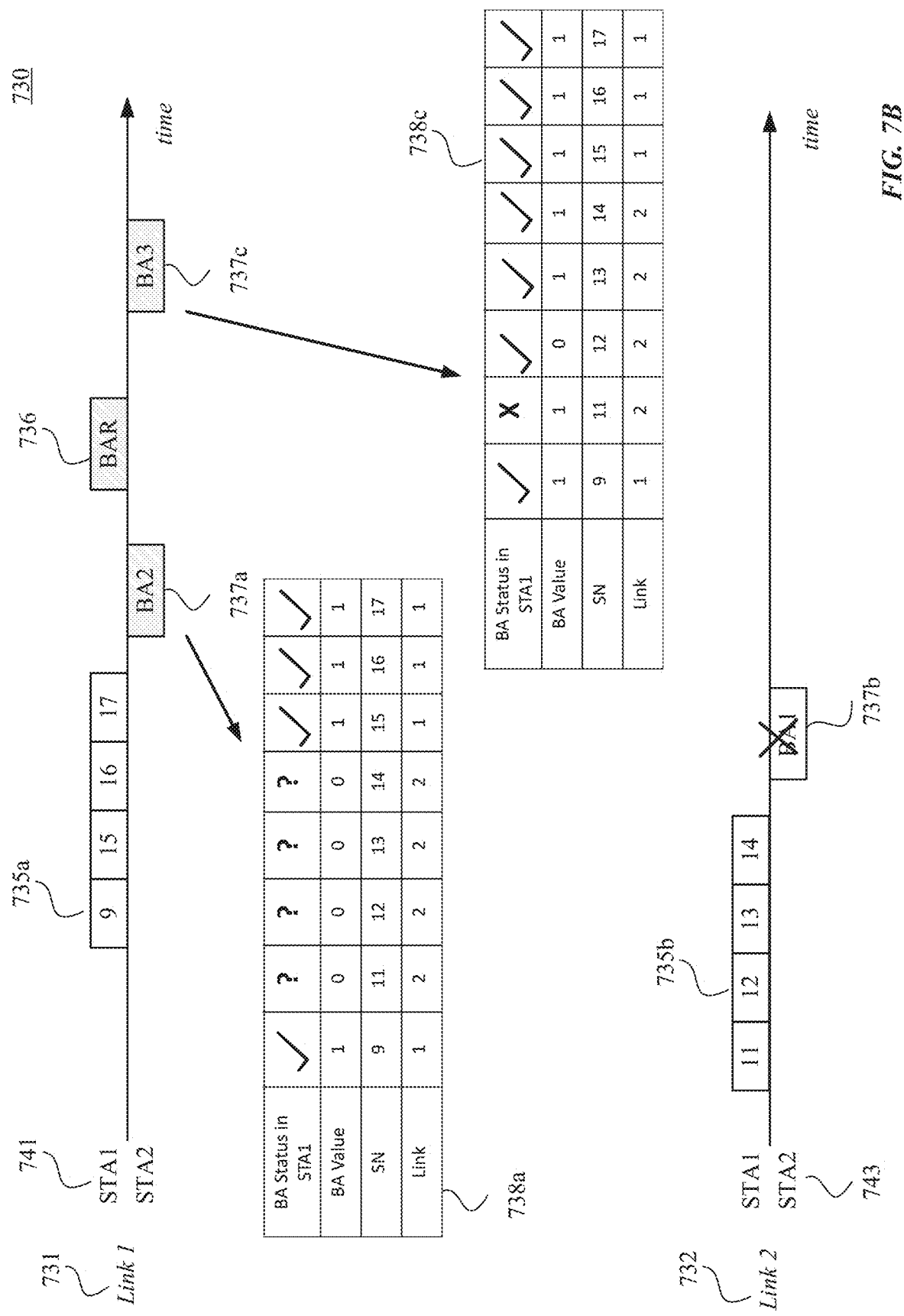
FIG. 7B illustrates another example block acknowledgment operation between two stations using block acknowledgment request, according to some embodiments of the disclosure.

FIG. 7B illustrates another example block acknowledgment operation between two stations using block acknowledgment request, according to some embodiments of the disclosure. Operation 730 of FIG. 7B illustrates time axes for two links 731 and 732, transmitted data (e.g., MPDUs) 735, block acknowledgment (BA) frame 737, and block acknowledgment request (BAR) frame 736.

According to the exemplary embodiment illustrated in FIG. 7B, the transmitting STA (e.g., transmitting STA 741) transmits A-MPDU 735b including MPDUs with sequence numbers 11, 12, 13, and 14 on link 732. Overlapping in time, transmitting STA 741 transmits A-MPDU 735a, which includes retransmitted MPDU with sequence number 9 and newly transmitted MPDUs with sequence numbers 15, 16, and 17 on link 731.

The receiving STA (e.g., receiving STA 743) transmits BA frame 737b on link 732 in response to A-MPDU 735b. Receiving STA 743 also transmits BA frame 737a on link 731 in response to A-MPDU 735a. In this exemplary embodiment, transmitting STA 741 does not receive BA frame 737b on link 732 but receives BA frame 737a on link 731. In this example, BA frame 737a on link 731 can indicate, as illustrated in table 738a, that MPDUs with sequence numbers 9, 15, 16, and 17 transmitted on link 731 (link 1) were correctly received at receiving STA 743 (BA value of 1). However, as illustrated in table 738a, the status of MPDUs with reference numbers 11, 12, 13, and 14 at transmitting STA 741 is unknown because BA frame 737b was not received at transmitting STA 741.

After a BA timeout (e.g., a time threshold for receiving a BA frame) is elapsed for BA frame 737b on link 732, transmitting STA 741 transmits a BAR frame 736 on link 731, according to some examples. In response to BAR frame 736, receiving STA 743 transmits BA frame 737c on link 741. In this example, BA frame 737c on link 731 can indicate, as illustrated in table 738c, that MPDUs with sequence numbers 11, 13, and 14 transmitted on link 732 (link 2) were correctly received at receiving STA 743 (BA value of 1) but MPDU with sequence number 12 transmitted on link 732 (link 2) was not correctly received at receiving STA 743 (BA value of 0).

In this example, although BA frame 737c (transmitted on link 731) indicates failed or missing MPDU with sequence number 12 (transmitted on link 732), transmitting STA 741 considers the feedback of failed or missing because it was solicited by transmitting STA 741 (using BAR 736.) In other words, and according to some examples, the transmitting STA considers a feedback of failed or missing received on a link for a frame that was transmitted on a different link when the feedback of failed or missing was in response to a request by the transmitting STA in response to a BA timeout being lapsed. Transmitting STA 741 can update the status of transmitted MPDUs as illustrated, for example, in table 738c.

Figure 8:
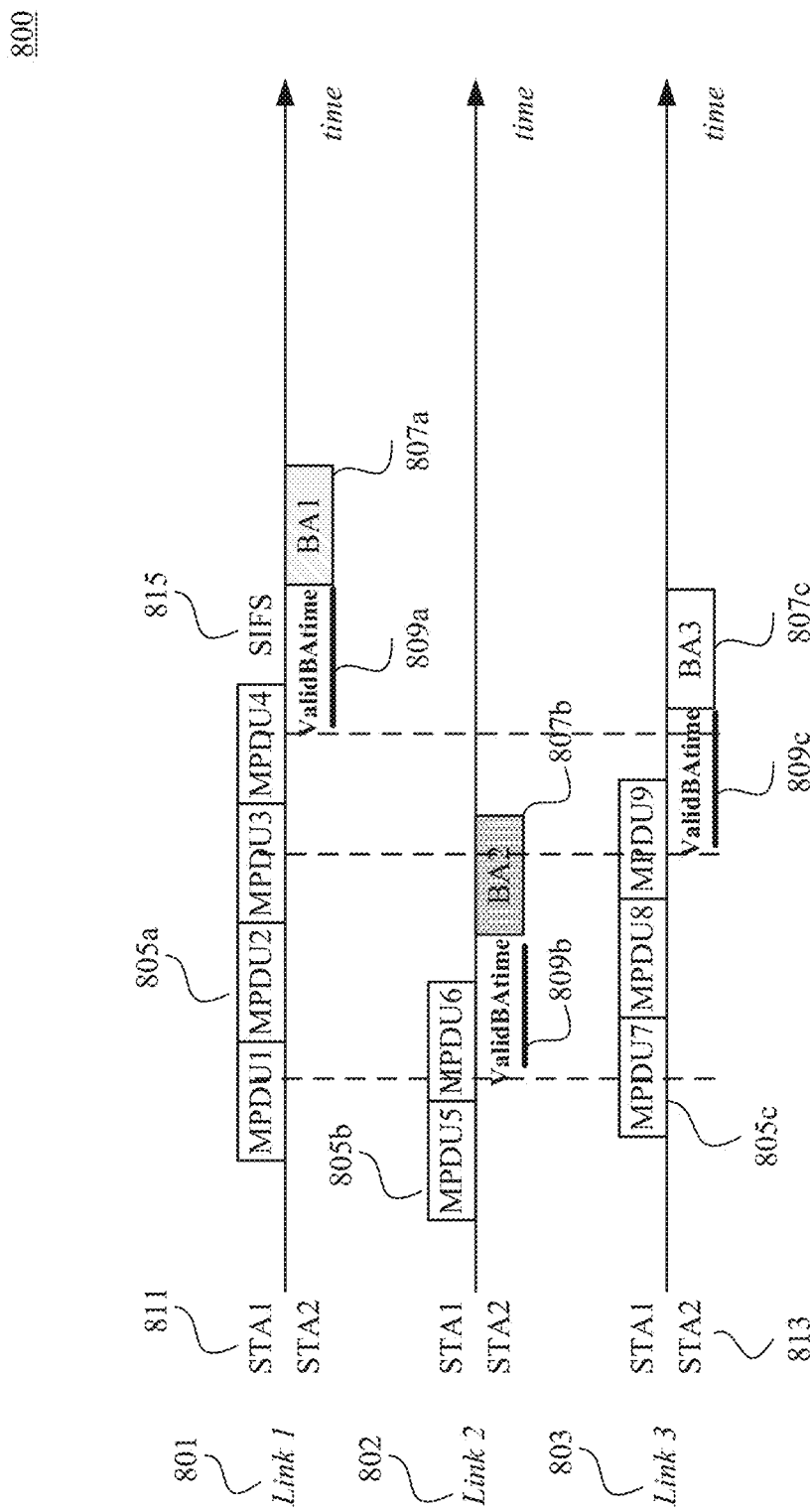
FIG. 8 illustrates another example block acknowledgment operation between two stations using three links, according to some embodiments of the disclosure.
Figure 9:
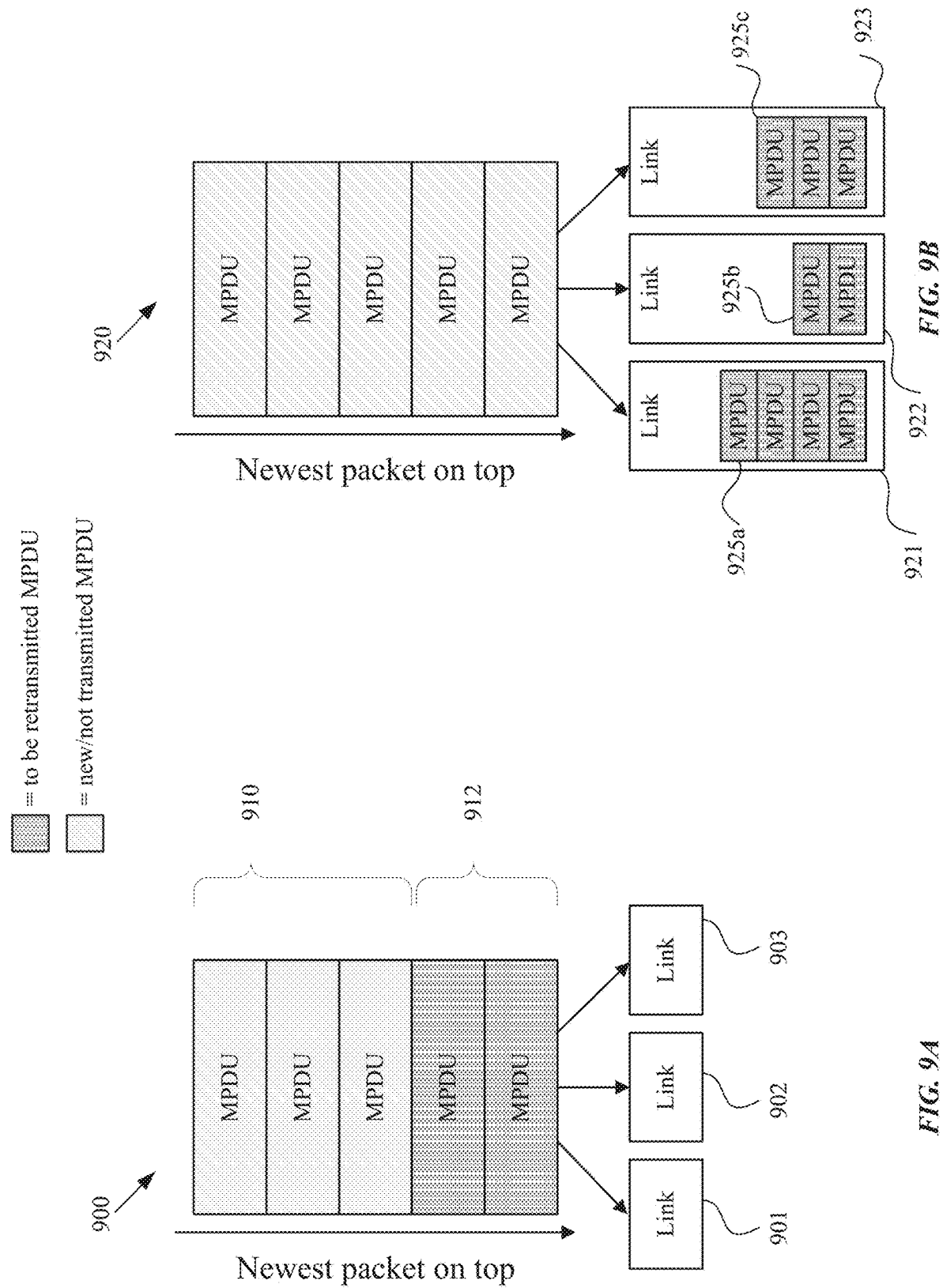
FIGS. 9A and 9B illustrate two implementations for transmission and retry queues, according to some embodiments of this disclosure.

FIG. 8 illustrates another example block acknowledgment operation between two stations using three links, according to some embodiments of the disclosure. Operation 800 of FIG. 8 illustrates time axes for three links 801-803, transmitted data (e.g., MPDUs) 805, and block acknowledgment (BA) frame 807.

In this embodiment, the transmitting STA (e.g., transmitting STA 811) and the receiving STA (e.g., receiving STA 813) agree on a processing time for an MPDU. In some examples, the processing time can be some of Short Interframe Space (SIFS) and a preamble duration. SIFS is an amount of time needed for a wireless interface of a device to process a received frame (e.g., an MPDU) and to respond with a response frame (e.g., a BA frame). In a non-limiting example, the processing time can be 36 μs (16 μs+20 μs). However, the embodiments of this disclosure are not limited to this example, and other values can be used as the processing time. In some embodiments, the processing time can be signaled during an acknowledgment scheme setup (for example, using Add Block Acknowledgment (ADDBA) request/response frames.) ADDBA signaling can set up the block acknowledgment transmission scheme.

In this example, the transmitting STA (e.g., transmitting STA 811) can store, for each transmitted MPDU, the time when the receiving STA (e.g., receiving STA 813) can indicate the status of the transmitted MPDU. Additionally or alternatively, the transmitting STA can store, for each transmitted MPDU, the link on which the MPDU was transmitted. In some examples, the transmitting STA can store this information in a transmission queue (e.g., TX queue 230 and/or 232) and/or in one or more retry queues (e.g., retry queues 231*a*/233*a*-231*n*/233*n*). In some examples, the transmitting STA can store this information in addition to the MPDU payload and MAC header.

According to some embodiments, the time when the receiving STA (e.g., receiving STA 813) can indicate the status of the transmitted MPDU is referred to as valid BA time (ValidBAtime). The ValidBAtime can be defined as the sum of the time when the MPDU transmission is completed and the processing time (discussed above).

According to some embodiments, after transmitting an MPDU, if transmitting STA 811 receives the BA frame before the ValidBAtime, then transmitting STA 811 considers the feedback of successful transmission of the MPDU (e.g., BA bitmap value of 1). In some examples, the feedback of successful transmission of the MPDU (e.g., BA bitmap value of 1) is considered from any BA frame on any link (e.g., irrespective of which link the MPDU was transmitted on.) According to some examples, a feedback of failed or missing MPDU (e.g., BA bitmap value of 0) received in a BA frame on the same link on which the MPDU was transmitted can also be considered. Transmitting STA 811 will ignore the feedback of failed or missing MPDU (e.g., BA bitmap value of 0) from BA frames on other links. When transmitting STA 811 determines, based on the received BA frame, that the MPDU was successfully transmitted, transmitting STA 811 erases the MPDU from its transmission queue (e.g., TX queue 230 and/or 232) and the MPDU is no longer retransmitted.

According to some embodiments, if the BA frame is received after the ValidBAtime, then transmitting STA 811 considers the feedback of failed or missing MPDU (e.g., BA bitmap value of 0) in all BA frames regardless of the link on which they are received. If transmitting BA 811 determines (based on the received BA frame) that the MPDU was not successfully transmitted, then the transmission queue (e.g., TX queue 230 and/or 232) is updated. For example, the failed or missing MPDU is set as not in transmission and is available for retransmission in any link. In some examples, if no BA frame is received at transmitting STA 811 at a BA timeout in the same channel in which the MPDU(s) was transmitted, then transmitting STA 811 may retransmit the MPDU(s). Additionally, or alternatively, transmitting STA 811 may transmit a BAR frame to request the retransmission of the BA frame.

These exemplary embodiments are further discussed with respect to FIG. 8. For example, as illustrated in FIG. 8, transmitting STA 811 transmits A-MPDU 805*a* including MPDUs with sequence numbers 1 through 4 on link 801. Receiving STA 813 transmits BA frame 807*a* on link 801. Transmitting STA 811 also transmits A-MPDU 805*b* including MPDUs with sequence numbers 5 through 6 on link 802. Receiving STA 813 transmits BA frame 807*b* on link 802. Similarly, transmitting STA 811 transmits A-MPDU 805*c* including MPDUs with sequence numbers 7 through 9 on link 803. Receiving STA 813 transmits BA frame 807*c* on link 803.

In this example, the transmission of MPDUs 1-3 and 5-9 on links 801-803 have ended before the ValidBAtime (e.g., ValidBAtime 809*a*) associated with the start of BA frame 807*a*. Therefore, transmitting STA 811 considers the feedback of failed or missing MPDU (e.g., BA bitmap value of 0) in BA frame 807*a* for any of the MPDUs with sequence numbers 1-3 and 5-9. This is because, as discussed above, if the BA frame is received after the ValidBAtime, then transmitting STA 811 considers the feedback of failed or missing MPDU (e.g., BA bitmap value of 0) in all BA frames regardless of the link on which they are received. Additionally, transmitting STA 811 considers the feedback of failed or missing MPDU (e.g., BA bitmap value of 0) in BA frame 807*a* for MPDU with sequence number 4 because a feedback of failed or missing MPDU (e.g., BA bitmap value of 0) was received in a BA frame on the same link on which the MPDU was transmitted can also be considered. Therefore, transmitting STA 811 considers the feedback of failed or missing MPDU (e.g., BA bitmap value of 0) in BA frame 807*a* for any of the MPDUs with sequence numbers 1-9.

Additionally, in this example, the transmission of MPUDs with sequence numbers 1-4 and 7-9 are not completed before the ValidBAtime (e.g., ValidBAtime 809*b*) associated with the start of BA frame 807*b*. Therefore, in this example, transmitting STA 811 can consider the feedback of failed or missing MPDU (e.g., BA bitmap value of 0) in BA frame 807*b* for MPDUs with sequence numbers 5 and 6, but not the sequence numbers 1-4 and 7-9. This is because a feedback of failed or missing MPDU (e.g., BA bitmap value of 0) received in a BA frame on the same link on which the MPDU was transmitted can also be considered.

Further, in this example, the transmission of MPUDs with sequence numbers 3 and 4 are not completed before the ValidBAtime (e.g., ValidBAtime 809*c*) associated with BA frame 807*c*. Therefore, in this example, transmitting STA 811 can consider the feedback of failed or missing MPDU (e.g., BA bitmap value of 0) in BA frame 807*c* for MPDUs with sequence numbers 1, 3, and 7-9. This is because, as discussed above, if the BA frame is received after the ValidBAtime, then transmitting STA 811 considers the feedback of failed or missing MPDU (e.g., BA bitmap value of 0) in all BA frames regardless of the link on which they are received. Also, this is because a feedback of failed or missing MPDU (e.g., BA bitmap value of 0) received in a BA frame on the same link on which the MPDU was transmitted can also be considered.

According to some embodiments, operation 800 of FIG. 8 can allow the retransmission (if needed) of MPDUs with sequence numbers 1 and 2 to be started earlier because BA frame 807*c* is received earlier than BA frame 807*a*. This can reduce delays in retransmission(s) of failed or missing MPDUs. This can be beneficial when, for example, the MPDUs are transmitted in high rates and/or the A-MPDUs are longer (e.g., 3-5 ms).

The block acknowledgment operation 800 that uses three links 801-803 can be extended to any number of links. According to some embodiments, block acknowledgment operation 800 can better utilize channel resources by, for example, avoiding duplicate retransmissions and/or reducing delays in acknowledgments. In some examples, using operation 800 of FIG. 8 can result in faster retransmission of failed MPDUs. For example, a worst case latency (e.g., 95 percentile latency) can be reduced. Additionally, operation 800 can increase throughput by, for example, making retransmissions faster. In some examples, operation 800 can allow the transmitting STA to release memory faster, which can further increase the transmission rate. For example, the transmission rate of high rate transmissions can be increased.

FIGS. 9A and 9B illustrate two implementations for transmission and retry queues, according to some embodiments of this disclosure. FIG. 9A illustrates one exemplary embodiment where queue 900 (e.g., a buffer, memory) stores all the MPDUs—new and not transmitted MPDUs 910 and the MPDUs to be retransmitted 912. In this example, queue 900 can be connected to link 901-903 to enable the transmitting STA to transmit and retransmits MPDUs through any links.

In the exemplary embodiment of FIG. 9B, the transmitting STA can include a transmission queue 920 (e.g., a buffer) and pre-link retry queues 925a-925c. These are similar to TX queue 230/232 and retry queues 231a/233a-231n/233n of FIG. 2. In this example, the retransmissions occur using the retry queues 925a-925c on their respective links. The transmission of new or not transmitted MPDUs can occur using buffer 920 over any link.

Although two implementations of transmission and retry queue are shown in FIGS. 9A and 9B, the embodiments of this disclosure are not limited to these examples and other implementations can be used.

Figure 10:
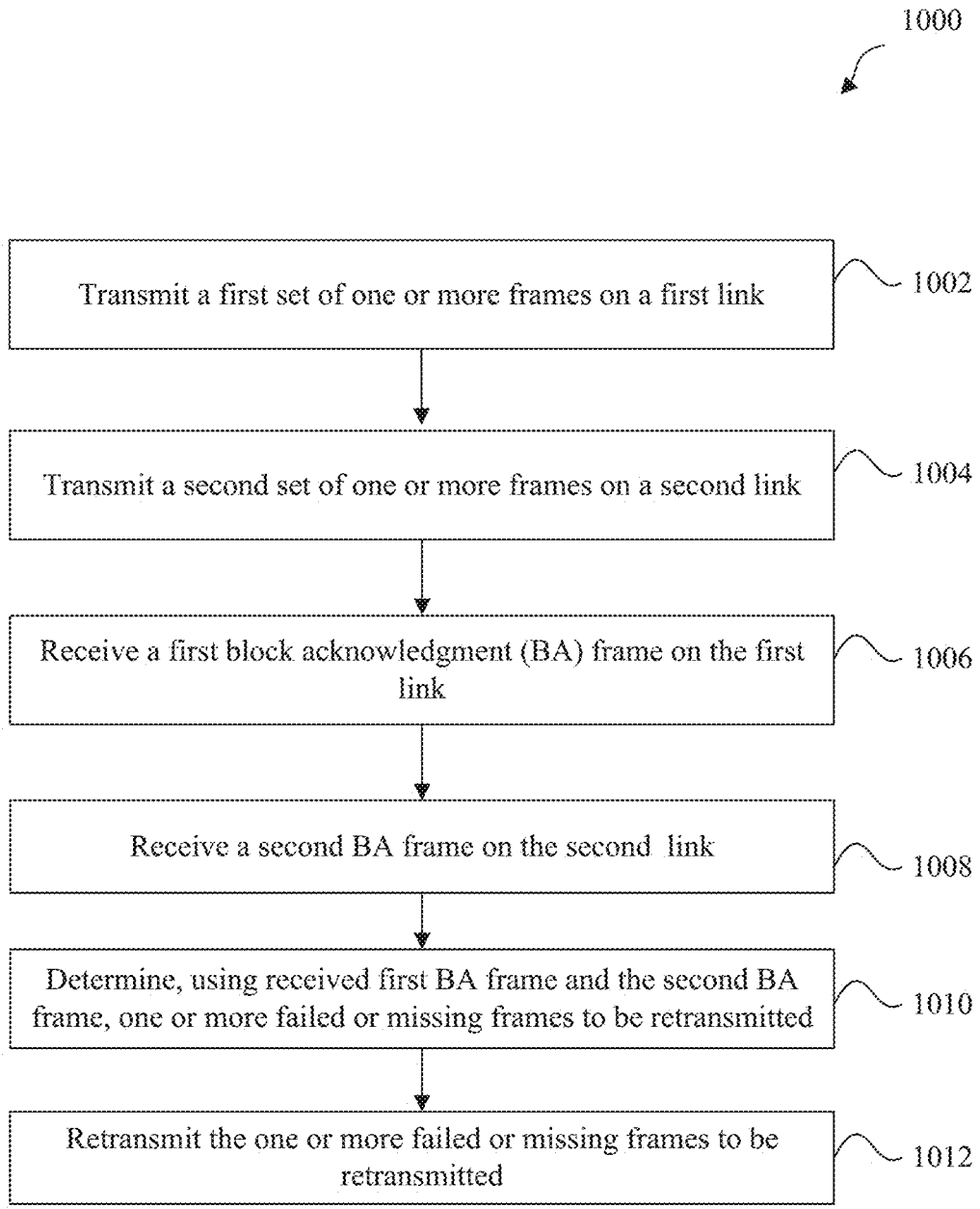
FIG. 10 illustrates an example method 1000 for a wireless system supporting block acknowledgment (BA) operations for multi-link wireless communication networks, according to some embodiments of the disclosure.

FIG. 10 illustrates an example method 1000 for a wireless system supporting block acknowledgment (BA) operations for multi-link wireless communication networks, according to some embodiments of the disclosure. As a convenience and not a limitation, FIG. 10 may be described with regard to elements of FIGS. 1-9. Method 1000 may represent the operation of an electronic device (e.g., a station such as STA 120a of FIGS. 1A and 1B) implementing BA operations for multi-link wireless communication networks. Method 1000 may also be performed by system 200 of FIG. 2 and/or computer system 1100 of FIG. 11. But method 1000 is not limited to the specific embodiments depicted in those figures and other systems may be used to perform the method as will be understood by those skilled in the art. It is to be appreciated that not all operations may be needed, and the operations may not be performed in the same order as shown in FIG. 10.

At 1002, a first set of one or more frames are transmitted on a first link. In some examples, the first set of one or more frames includes an aggregate medium access control (MAC) protocol data unit (A-MPDU) including one or more MAC protocol data units (MPDUs) that are aggregated together. The A-MPDU can include one or more of A-MPDUs 403 of FIG. 4, 503 of FIG. 5A, 533 of FIG. 5B, 603 of FIG. 6, 705 of FIG. 7A, 735 of FIG. 7B, or 805 of FIG. 8. According to some embodiments, the first set of one or more frames are transmitted using transceiver 220 of FIG. 2 of an electronic device such as STA 120a to another electronic device such as STA 120b.

At 1004, a second set of one or more frames are transmitted on a second link. In some examples, the second set of one or more frames includes an aggregate medium access control (MAC) protocol data unit (A-MPDU) including one or more MAC protocol data units (MPDUs). The A-MPDU can include one or more of A-MPDUs 403 of FIG. 4, 503 of FIG. 5A, 533 of FIG. 5B, 603 of FIG. 6, 705 of FIG. 7A, 735 of FIG. 7B, or 805 of FIG. 8. According to some embodiments, the second set of one or more frames are transmitted using transceiver 220 of FIG. 2 of an electronic device such as STA 120a to another electronic device such as STA 120b. According to some embodiments the first and the second links are different links such as links 150a-150c of FIG. 1B, links 401, 402 of FIG. 4, links 501, 502 of FIG. 5A, links 531, 531 of FIG. 5B, links 601, 602 of FIG. 6, links 701-703 of FIG. 7A, links 731 and 732 of FIG. 7B, or links 801-803 of FIG. 8.

At 1006, a first block acknowledgment (BA) frame is received on the first link. According to some embodiments, the first BA frame is received using transceiver 220 of FIG. 2 of an electronic device such as STA 120a from another electronic device such as STA 120b. At 1008, a second block acknowledgment (BA) frame is received on the second link. According to some embodiments, the second BA frame is received using transceiver 220 of FIG. 2 of an electronic device such as STA 120a from another electronic device such as STA 120b.

At 1010, the electronic device (e.g., STA 120a) determines, using received first BA frame and the second BA frame, one or more failed or missing frames to be retransmitted. At 1012, the electronic device retransmits the one or more failed or missing frames. The embodiments of this disclosure, as discussed with respect to FIGS. 3-9 provide exemplary methods for BA operations and retransmissions of failed or missing frames for multi-link communication networks.

For example, according to some embodiments, and as discussed with respect to, for example, FIG. 5A, the electronic device (e.g., STA 120a) includes a first retry queue (e.g., retry queue 231a/233a) associated with the first link and a second retry queue (e.g., retry queue 231b/233b) associated with the second link. In this example, the electronic device (using, for example, processor 210) is configured to determine whether the one or more failed or missing frames were transmitted on the first link or the second link. In response to determining that a first one of the one or more failed or missing frames was transmitted on the first link, then the electronic device (using, for example, processor 210) is configured to update the first retry queue to store the first one of the one or more failed or missing frames. Additionally, the electronic device (using, for example, processor 210 and transceiver 220) is configured to retransmit, to the other electronic device (e.g., STA 120b), the first one of the one or more failed or missing frames on the first link. Additionally or alternatively, in response to determining that a second one of the one or more failed or missing frames was transmitted on the second link, then the electronic device (using, for example, processor 210) is configured to update the second retry queue to store the second one of the one or more failed or missing frames. Additionally, the electronic device (using, for example, processor 210 and transceiver 220) can retransmit, using the transceiver and to the other electronic device, the second one of the one or more failed or missing frames on the second link.

According to some embodiments, and as discussed with respect to, for example, FIG. 5B, the electronic device (e.g., STA 120a) includes a first retry queue (e.g., retry queue 231a/233a) associated with the first link and a second retry queue (e.g., retry queue 231b/233b) associated with the second link. In this example, the electronic device (using, for example, processor 210) is configured to combine and reshuffle the per-link retry queues (e.g., retry queues 231 and 233) such that certain frames (e.g., MPDUs) that are failed on, for example, the first link, can be retransmitted on the second link. For example, in response to a determination that a first one of the one or more failed or missing frames was transmitted on the first link, the electronic device (using, for example, processor 210) can update the first retry queue to store the first one of the one or more failed or missing frames. Also, in response to a determination that a second one of the one or more failed or missing frames was transmitted on the second link, the electronic device (using, for example, processor 210) can update the second retry queue to store the second one of the one or more failed or missing frames. In this example, the electronic device (using, for example, processor 210) can combine and reshuffle the per-link retry queues. For example, the electronic device (using, for example, processor 210) can update the first retry queue to store both the first one of the one or more failed or missing frames and the second one of the one or more failed or missing frames. The electronic device (using, for example, processor 210 and transceiver 220) can retransmit, to the other electronic device, both the first one of the one or more failed or missing frames and the second one of the one or more failed or missing frames on the first link.

According to some embodiments, and as discussed with respect to, for example, FIG. 7A, the second BA frame received on the second link can include a feedback of failed or missing associated with a frame of the first set of one or more frames transmitted on the first link. In these embodiments, and to determine the one or more failed or missing frames to be retransmitted the electronic device (using, for example, processor 210) can ignore the feedback of failed or missing associated with the frame of the first set of one or more frames.

Alternatively, and according to some embodiments as discussed with respect to, for example, FIG. 7B, to determine the one or more failed or missing frames to be retransmitted, the electronic device (using, for example, processor 210) considers the feedback of failed or missing (in the second BA frame received on the second link) associated with the frame of the first set of one or more frames (which was transmitted on the first link) if the feedback is in response to a request by the electronic device in response to a BA timeout being lapsed.

According to some embodiments, and as discussed with respect to, for example, FIG. 8, the electronic device (using, for example, processor 210) can determine, for a frame of the first set of one or more frames transmitted on the first link, a valid BA time (ValidBAtime), where the valid BA time includes a sum of a time when the frame's transmission is completed and a processing time. In response to a determination that the frame's transmission was not completed the valid BA time before the second BA frame on the second link, the electronic device (using, for example, processor 210) can ignore a feedback of failed or missing associated with the frame in the second BA frame. Additionally or alternatively, in response to a determination that the frame's transmission was completed the valid BA time before the second BA frame on the second link, the electronic device (using, for example, processor 210) can consider a feedback of failed or missing associated with the frame in the second BA frame.

Figure 11:
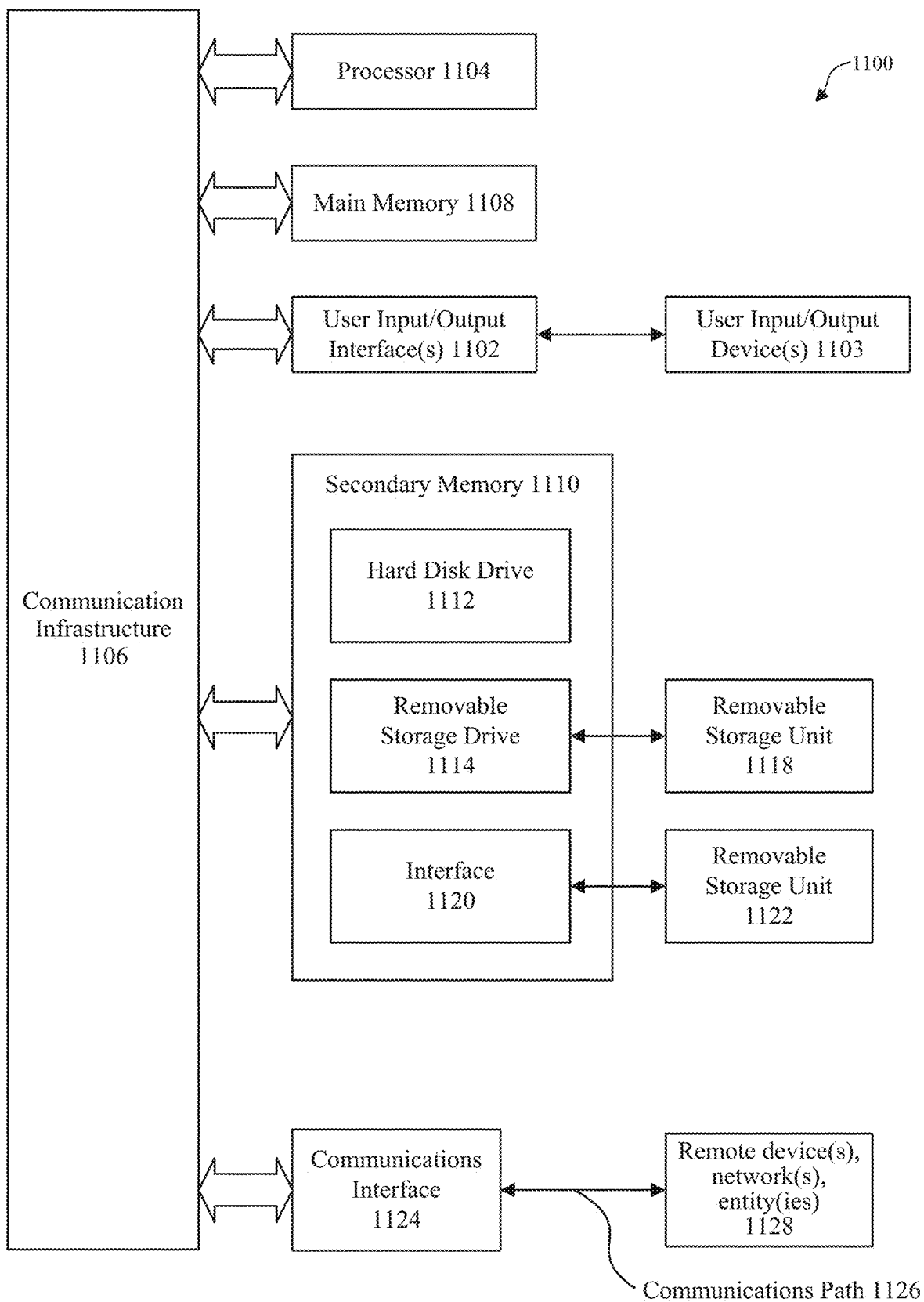
FIG. 11 is an example computer system for implementing some embodiments or portion(s) thereof.

Various embodiments can be implemented, for example, using one or more computer systems, such as computer system 1100 shown in FIG. 11. Computer system 1100 can be any well-known computer capable of performing the functions described herein such as devices 110, 120 of FIG. 1, or 200 of FIG. 2. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
   a transceiver configured to communicate over a wireless network; and
   one or more processors communicatively coupled to the transceiver and configured to:
   transmit, using the transceiver and to a second electronic device, a first set of one or more frames on a first link;
   transmit, using the transceiver and to the second electronic device, a second set of one or more frames on a second link;
   select, based on respective qualities of the first link and the second link, the first link for transmitting a block acknowledgment request (BAR) frame;
   transmit, using the transceiver, the BAR frame on the first link to the second electronic device in response to a determination that no data is being transmitted on the first link and the second link;
   receive, using the transceiver and from the second electronic device, a first block acknowledgment (BA) frame on the first link; and
   in response to the first BA frame comprising feedback information for the second set of one or more frames transmitted on the second link, determine a failed or missing frame of the second set of one or more frames.

2. The electronic device of claim 1, wherein the transmission of the first set of one or more frames and the transmission of the second set of one or more frames partially overlap in time.

3. The electronic device of claim 1, wherein the one or more processors are further configured to retransmit, using the transceiver and to the second electronic device, the failed or missing frame on the second link.

4. The electronic device of claim 1, wherein the one or more processors are further configured to:
   determine, based on the first BA frame received on the first link, a second failed or missing frame of the first set of one or more frames transmitted on the first link;
   retransmit, using the transceiver and to the second electronic device, the second failed or missing frame on the first link; and
   retransmit, using the transceiver and to the second electronic device, the failed or missing frame on the second link.

5. The electronic device of claim 1, wherein the one or more processors are further configured to:
   retransmit, using the transceiver and to the second electronic device, the failed or missing frame on the first link.

6. The electronic device of claim 1, wherein to transmit the BAR frame, the one or more processors are further configured to:
   transmit, using the transceiver and to the second electronic device, the BAR frame on the first link further in response to a determination that a BA window has been exhausted, wherein a size of the BA window is based on a number of frames that are outstanding and are waiting for acknowledgment.

7. The electronic device of claim 1, wherein the transceiver comprises a queue configured to store the first set of one or more frames, the second set of one or more frames, and the failed or missing frame.

8. The electronic device of claim 1, wherein the feedback information comprises a failed or missing feedback associated with a frame of the second set of one or more frames and the one or more processors are further configured to ignore the failed or missing feedback.

9. A method, comprising:
   transmitting, by a first electronic device and to a second electronic device, a first set of one or more frames on a first link;

transmitting, by the first electronic device and to the second electronic device, a second set of one or more frames on a second link;

selecting, by the first electronic device based on respective qualities of the first link and the second link, the first link for transmitting a block acknowledgment request (BAR) frame;

transmitting, by the first electronic device, the BAR frame on the first link to the second electronic device in response to a determination that no data is being transmitted on the first link and the second link;

receiving, by the first electronic device and from the second electronic device, a first block acknowledgment (BA) frame on the first link; and in response to the first BA frame comprising feedback information for the second set of one or more frames transmitted on the second link, determining a failed or missing frame of the second set of one or more frames.

10. The method of claim 9, wherein the transmission of the first set of one or more frames and the transmission of the second set of one or more frames partially overlap in time.

11. The method of claim 9, further comprising:
retransmitting, by the first electronic device and to the second electronic device, the failed or missing frame on the second link.

12. The method of claim 9, further comprising:
determine, by the first electronic device and based on the first BA frame received on the first link, a second failed or missing frame of the first set of one or more frames transmitted on the first link;

retransmitting, by the first electronic device and to the second electronic device, the second failed or missing frame on the first link; and retransmitting, by the first electronic device and to the second electronic device, the failed or missing frame on the second link.

13. The method of claim 9, further comprising:
retransmitting, by the first electronic device and to the second electronic device, the failed or missing frame on the first link.

14. The method of claim 9, wherein transmitting the BAR frame further comprises:
transmitting, by the first electronic device and to the second electronic device, the BAR frame on the first link further in response to a determination that a BA window has been exhausted, wherein a size of the BA window is based on a number of frames that are outstanding and are waiting for acknowledgment.

15. The method of claim 9, wherein the first electronic device comprises a queue configured to store the first set of one or more frames, the second set of one or more frames, and the failed or missing frame.

16. The method of claim 9, wherein the feedback information comprises a failed or missing feedback associated with a frame of the second set of one or more frames and the method further comprises ignoring the failed or missing feedback.

17. The method of claim 9, wherein the feedback information comprises a feedback of successful transmission associated with a frame of the second set of one or more frames and the method further comprises using the feedback of successful transmission.

18. A non-transitory computer-readable medium storing instructions that, when executed by a processor of an electronic device, cause the processor to perform operations, the operations comprising:
transmitting a first set of one or more frames on a first link to a second electronic device;

transmitting a second set of one or more frames on a second link to the second electronic device;

selecting, based on respective qualities of the first link and the second link, the first link for transmitting a block acknowledgment request (BAR) frame;

transmitting the BAR frame on the first link to the second electronic device in response to a determination that no data is being transmitted on the first link and the second link;

receiving a first block acknowledgment (BA) frame on the first link from the second electronic device; and in response to the first BA frame comprising feedback information for the second set of one or more frames transmitted on the second link, determining a failed or missing frame of the second set of one or more frames.

19. The non-transitory computer-readable medium of claim 18, the operations further comprising:
retransmitting the failed or missing frame on the second link to the second electronic device.

20. The non-transitory computer-readable medium of claim 18, wherein transmitting the BAR frame further comprises:
transmitting, to the second electronic device, the BAR frame on the first link further in response to a determination that a BA window has been exhausted, wherein a size of the BA window is based on a number of frames that are outstanding and are waiting for acknowledgment.

* * * * *